(12) United States Patent
Lee et al.

(10) Patent No.: US 6,822,999 B1
(45) Date of Patent: Nov. 23, 2004

(54) HIGH-SPEED CELL SEARCHING APPARATUS AND METHOD FOR COMMUNICATION SYSTEM

(75) Inventors: Byeong Gi Lee, Seoul (KR); Byoung Hoon Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 691 days.

(21) Appl. No.: 09/708,453

(22) Filed: Nov. 9, 2000

(30) Foreign Application Priority Data

Nov. 13, 1999 (KR) ........................................ 1999-50476
Mar. 24, 2000 (KR) ........................................ 2000-15105

(51) Int. Cl.[7] .............................................. H04B 1/707
(52) U.S. Cl. ...................................... 375/145; 375/141
(58) Field of Search ................................ 375/141, 142, 375/130, 145, 152, 136, 150, 143, 343, 240.2; 370/331, 342, 441, 335; 455/502, 506, 434

(56) References Cited

U.S. PATENT DOCUMENTS

| | | | | |
|---|---|---|---|---|
| 5,241,602 A | * | 8/1993 | Lee et al. ................. | 380/268 |
| 5,355,415 A | * | 10/1994 | Lee et al. ................. | 380/47 |
| 5,644,591 A | * | 7/1997 | Sutton ..................... | 375/142 |
| 6,289,007 B1 | * | 9/2001 | Kim et al. ................ | 370/331 |
| 6,370,134 B1 | * | 4/2002 | Aramaki .................. | 370/342 |
| 6,389,058 B1 | * | 5/2002 | Lee et al. ................. | 375/141 |

OTHER PUBLICATIONS

Parallel DSA for fast acquistion in M–ary DS/CDMA systems, Lee et al.; Communications, 1999. APCC/OECC '99. Fifth Asia–Pacific Conference on . . . and Fourth Optoelectronics and Communications Conference, vol.: 1, Oct. 18–22, 1999, p. 727–730 vol. 1.*

DSA: a distributed sample–based fast DS/CDMA acquistion technique, Byoung–Hoon Kim; Byeong Gi Lee; Communications, IEEE Transactions on, vol.: 47, Issue 5, May 1999, pp.: 754–765.*

* cited by examiner

Primary Examiner—Stephen Chin
Assistant Examiner—Ted Wang
(74) Attorney, Agent, or Firm—Fleshner & Kim, LLP

(57) ABSTRACT

A high-speed cell searching apparatus and method for a communication system. The apparatus uses a distributed sample acquisition method and a correlation-assistant distributed sample acquisition method to achieve a high-speed acquisition of long-period scrambling sequences used in a direct sequence code division multiple access (DS/CDMA) cellular system even in a very inferior channel environment. The apparatus further uses a comparison-correction-based synchronization method and a state symbol correlation method according to the DSA technique in the DS/CDMA cellular system.

32 Claims, 14 Drawing Sheets

HIGH-SPEED CELL SEARCHING APPARATUS AND METHOD FOR COMMUNICATION SYSTEM

BACKGROUND OF THE INVENTION

1. Field of the Invention

The present invention relates to a high-speed cell searching apparatus and method for a communication system.

2. Background of the Related Art

In a direct sequence code division multiple access (DS/CDMA) communication system, a receiver is first required to synchronize PN sequences prior to detection of data. Mostly, the PN sequence synchronization is performed by two steps of code acquisition and code tracking in sequence.

Here, regarding the code acquisition, many researches have been made for a cell synchronous type system such as the existing IS-95 system whereby the whole cells share timing information using an external reference signal.

The most basic code acquisition-technique proposed up to now is a serial search. This method has an advantage that its implementation is not complex, but has a disadvantage that since the acquisition time is directly in proportion to the period of the PN sequence being used, it takes quite a long acquisition time in case that the period of the PN sequence is long.

Meanwhile, a parallel search has been proposed to acquire the PN sequences having a long period. However, this parallel search has a disadvantage that its implementation becomes complicated in proportion to the reduced acquisition time.

Ultimately, a hybrid method, which properly sacrifices and complements the acquisition speed and the complexity of implementation by adequately combining the serial search and the parallel search for the high-speed acquisition of the PN sequences, has been proposed, and another high-speed acquisition method based on state estimation of a shift register generator (SRG) has been proposed as well.

As the acquisition technique based on the state estimation of the SRG, there is a rapid acquisition by sequential estimation. This technique sequentially performs a hard detection of the received PN sequences a large number of times, carries them as temporary register state values of the receiving part SRG, and then finally decides whether or not it is synchronized through a confirming process. This technique has an advantage that it can greatly reduce the acquisition time without increasing the implementation complexity in comparison to the serial search in theory, but has a disadvantage that its performance abruptly deteriorates in case that it is based on a coherent detection of the PN sequences and has a low signal-to-noise ratio (SNR), and thus it is improper to apply it in a general code division multiple access (CDMA) environment.

Because of this, an acquisition technique based on a new state estimation named a distributed sample acquisition (DSA) technique has been proposed to reduce the acquisition time of the long-period PN sequences in the conventional cell synchronous type system.

According to this DSA technique, the transmitting part generates an igniter sequence having a relatively short period, and transmits the igniter sequence with state samples of the long-period PN sequences being carried thereon. The receiving part first acquires the igniter sequence, demodulates the state samples carried thereon, and corrects the SRG state of the receiver through a comparison-correction circuit at every accurate time point, so that the synchronization of the PN sequences is performed.

Since a pair of SRGs having the same structure and provided in the transmitting/receiving part perform the synchronization by carrying the same state values, i.e., L values stored in the SRG having the length of L, they can transfer the state samples of the transmitting part SRG to the receiving part using the DSA technique. As a result, this technique can acquire the PN sequence much faster than the existing technique that performs the synchronization at the time point where the maximum correlation value for the PN sequences is detected.

The high-speed acquisition using the DSA technique as described above has been limitedly applied to the cell synchronous type DS/CDMA system.

However, in the present environment that the DS/CDMA technique is expected to be applied to a cell asynchronous type system that does not depend on an external reference signal such as an international mobile telecommunication-2000 (IMT-2000), it is required that the DSA technique for more rapidly acquiring the PN sequence is extensively applied to the cell asynchronous type DS/CDMA system which is much more complicated in timing synchronization in comparison to the cell synchronous DS/CDMA system.

Meanwhile, the DS/CDMA cellular system for a mobile radio communication service such as the IMT-2000 to be developed is briefly classified into a cell asynchronous system and a cell synchronous system according as a reference timing between cells is provided or not.

In the cell synchronous system, a respective cell uses a sequence depending on an external reference timing providing resource such as a global positioning system (GSP) and obtained by differently shifting the phase of a single pseudo noise sequence as its scrambling sequence.

On the contrary, the cell asynchronous system uses a sequence differently given to the respective cell irrespective of the external reference timing as its scrambling sequence. For instance, in case of the asynchronous cellular system composed of 512 cells, 512 long-period scrambling sequences are required. For this, the cell asynchronous system such as the next-generation IMT-2000 differently combines the sequences generated using a plurality of (for example, two) fixed shift register generators (SRGs), and produces 512 different scrambling sequences.

The cell asynchronous system wherein the respective cell uses one among the 512 sequences performs a scrambling sequence acquisition for the sequence synchronization. In the scrambling sequence acquisition, a simple search for the frame timing required in the cell synchronous system, and discrimination of the sequence itself used in the present cell is performed as well.

According to the existing cell synchronous system, the serial search, parallel search, and hybrid method, which properly sacrifices and complements the acquisition speed and the complexity of implementation by adequately combining the serial search and the parallel search, have been used for performing the synchronization through the chip correlation of the sequences to acquire the scrambling sequence. Meanwhile, in case of the cell asynchronous system, a three-step cell searching method based on a method of removing a comma-free code and hierarchical uncertainty has been used.

The cell synchronous system using the serial search, parallel search, and hybrid method performs the synchronization by discriminating the timing representing the maximum correlation value obtaining by correlating the received scrambling sequence and the scrambling sequence generated by a mobile station. However, since the cell asynchronous system using the three-step cell searching method identifies both the kind and timing of the scrambling sequence, it should perform an additional synchronizing code transmission and more complicated signal process.

Hereinafter, the cell asynchronous system using the three-step cell searching method will be explained in detail, taking the W-CDMA system of IMT-2000 as an example, with reference to the channel structure and timing as illustrated in FIG. 1.

Respective 512 cells (i.e., base stations) transmit scrambling sequences of the corresponding cells through primary common pilot channels (P-CPICH), and transmit in parallel a primary synchronization code (PSC) which is commonly used by the 512 cells and secondary synchronization codes (SSC) which are peculiarly used by respective cell (i.e., base station) groups that the cells belong to.

Symbols transmitted through the SCH are transmitted, crossing in time with symbols of a broadcasting channel (BCH) transmitted through the primary common control physical channel (P-CCPCH) of the respective cells, in the transmission ratio of 1:9. Specifically, the primary synchronization code (PSC) and the secondary synchronization code (SSC) are simultaneously transmitted in a 256-chip section which is the first symbol transmission time point for each slot.

The mobile station (MS), at the first cell searching step, searches a slot boundary by searching the time point where a matched filter for the primary synchronization code (PSC) produces the maximum output value. At the second step, the mobile station identifies the frame boundary and cell (i.e., base station) group by decoding 15 secondary synchronization codes (SSC) transmitted for a one-frame length. At the third step, the mobile station searches the sequence representing the maximum output by correlating in parallel the scrambling sequences of the cells, which belong to the cell (i.e., base station) group searched at the previous step, with the received P-CPICH signals to complete the cell search. In the three-step cell searching method, the first and third steps relates to the process of reducing the uncertainty of the timing and the kind of the sequence through the correlation of the sequences well known in the art, and the second step is the actually peculiar process of reducing quite a large amount of uncertainty by the comma-free encoding and decoding.

Meanwhile, in order to effect a high-speed acquisition of the scrambling sequences, the distributed sample acquisition (DSA), which is quite different from the existing methods as described above, has also been proposed.

According to the DSA technique, in order to acquire the scrambling sequences at a high speed, the base station (i.e., cell) first transmits state samples of the SRG which produces the long-period scrambling sequences using the relatively short-period igniter sequence. The mobile station (MS) performs the synchronization in a manner that it synchronizes the igniter sequence, detects the state samples carried thereon, comparing the state samples with samples of the SRG provided in the mobile station itself, and sequentially corrects the state of its SRG according to a result of comparison. Thus, the DSA technique is referred to the high-speed scrambling sequence acquisition method through the comparison-correction of the SRG state samples.

By using the DSA technique, an effective high-speed synchronization performance can be obtained for both the cell synchronous system and the cell asynchronous system. However, such performance is limited to the case that the signal-to-noise ratio (SNR) for the channel is in a high or properly low level.

Specifically, in case of using the DSA technique, a superior high-speed acquisition performance can be maintained down to the properly low-leveled SNR for the channel, but the DSA technique suffers the abrupt deterioration of performance in the environment that the SNR becomes very low due to a fading or shadowing effect or in case that errors of the state sample detection are frequent due to the clock frequency errors between the base station and the mobile station (MS). Accordingly, a new complementary counter plan is required to maintain the superior high-speed acquisition even in the inferior environment as described above.

SUMMARY OF THE INVENTION

Accordingly, the present invention is directed to a high-speed cell searching apparatus for a communication system that substantially obviates one or more of the problems due to limitations and disadvantages of the related art.

An object of the present invention is to provide a high-speed cell searching apparatus for a communication system suitable for more rapidly discriminating and acquiring PN sequences having a long period.

Another object of the present invention is to provide a high-speed cell searching apparatus for a communication system which can perform a high-speed acquisition of long-period scrambling sequences used in a W-CDMA system even in a inferior channel environment.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the present invention applies the DSA technique based on the state estimation to the code acquisition process for sequence synchronization in an asynchronous DS/CDMA system. Also, the present invention further employs the comparison-correction-based synchronization and the correlation for the state symbols according to the DSA technique in a DS/CDMA cellular system.

The high-speed cell searching apparatus according to the present invention includes a DSA spreading section and a sample spreading section provided in a base station, and a sample despreading section and a DSA despreading section provided in a mobile station.

The DSA spreading section produces scrambling sequences in a complex form using at least two first main sequences, spreads and scrambles user data using the scrambling sequences, and samples respective states of the at least two first main sequences.

The sample spreading section modulates respective state sample values outputted from the DSA spreading section into code symbols, and spreads the modulated symbols using at least two first igniter sequences.

The sample despreading section produces at least two second igniter sequences, and despreads and demodulates the input state signals using the second igniter sequences.

The DSA despreading section produces at least two second main sequences, synchronizes the second main sequences and the first main sequences of the DSA spreading section using the state samples outputted from the sample despreading section, and despreads and descrambles the spread user data by the complex scrambling sequences produced using the synchronized second main sequences.

Preferably, the period of the igniter sequences is relatively shorter than the period of the main sequences.

Preferably, the base station transmits primary synchronization code (PSC) commonly used in all the base stations, and the mobile station is selectively provided with a matched filter that takes correlation for the primary synchronization code (PSC) received from the base station for the igniter sequence acquisition.

Preferably, the sample spreading section can selectively perform a quadrature phase shift encoding instead of a differential phase shift encoding, and accordingly the sample despreading section can selectively perform a quadrature phase shift decoding instead of a differential phase shift decoding.

In another aspect of the present invention, there is provided a high-speed cell searching method for a communication system comprising the steps of a base station producing at least two first main sequences and modulating state sample values for states of the respective main sequences, the base station spreading and transmitting modulated state symbols with first igniter sequences, a mobile station producing at least two second igniter sequences, the mobile station demodulating the state symbols received from the base station using the second igniter sequences, the mobile station producing at least two second main sequences, the mobile station comparing state samples sequentially obtained by demodulation with state samples for respective states of the second main sequences, and the mobile station performing repeated correction for the respective states of the second main sequences according to a result of comparison.

Preferably, the high-speed cell searching method for a communication system according to the present invention further comprises the steps of storing for a predetermined frame period soft-decision state symbols obtained by the demodulation in preparation for a case that a state of the first main sequences of the base station is not synchronized with a state of the second main sequences of the mobile station through the step of comparison and repeated correction, and acquiring the first main sequences of the base station by performing correlation with respect to the stored soft-decision state symbols.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

First Embodiment

The high-speed cell searching method and apparatus using a DSA according to a preferred embodiment of the present invention will be explained with reference to FIGS. 1 and 2.

According to the embodiment of the present invention, a high-speed discrimination and acquisition of long-period PN sequences is performed using the DSA technique in the cell asynchronous DS/CDMA system.

In the cell asynchronous DS/CDMA system based on the DSA, respective base stations spread information on the long-period PN sequence modulated by DPSK (i.e., symbols for state samples) with short-period igniter sequences, and broadcast the spread information through a common pilot channel.

Accordingly, a base station identifies and obtains the corresponding igniter sequence of the cell region where the mobile station is currently positioned, and detects the information on the long-period PN sequence DPSK-modulated and transferred by despreading the information with the igniter sequence already obtained.

Figure 1:
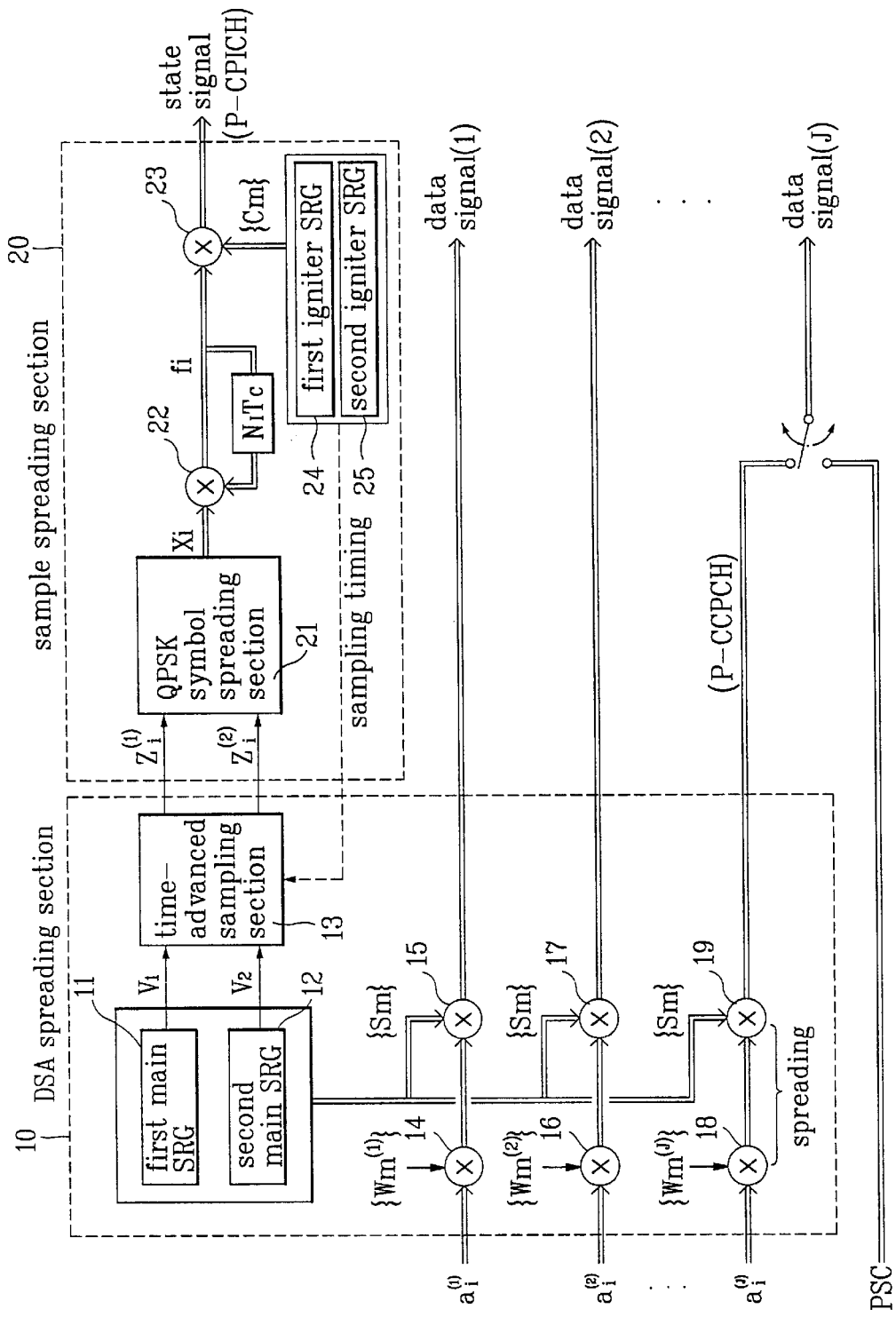
FIG. 1 is a block diagram illustrating the partial construction of a base station in a cell asynchronous W-CDMA system using a DSA technique.
Figure 2:
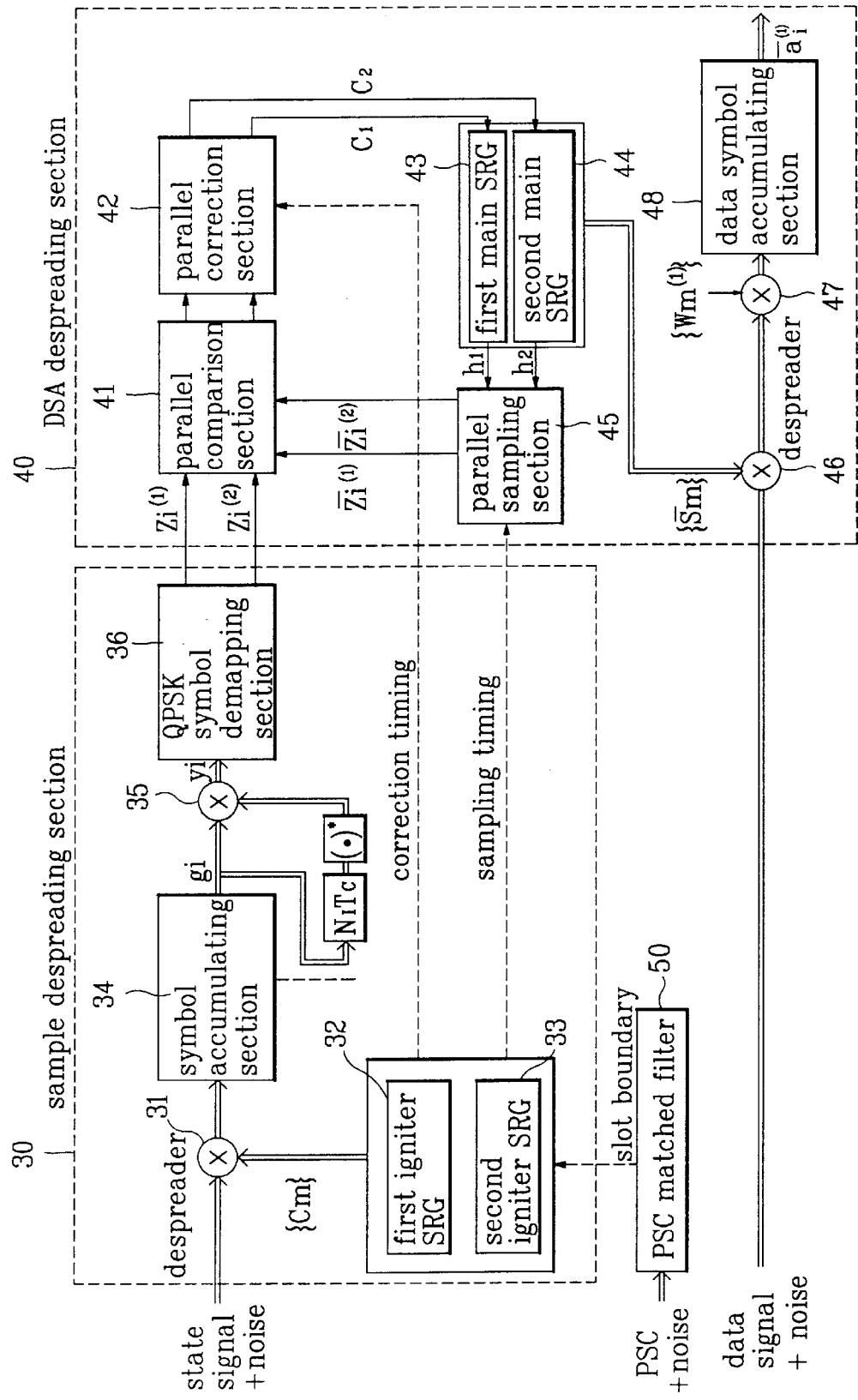
FIG. 2 is a block diagram illustrating the partial construction of a mobile station in a cell synchronous W-CDMA system using a DSA technique.

FIG. 1 is a block diagram illustrating the partial construction of the base station in the cell asynchronous DS/CDMA system using the DSA technique according to the present invention, and FIG. 2 is a block diagram illustrating the partial construction of the mobile station.

The present invention using the DSA technique is for searching cells at a high speed. To achieve this, the following two particulars should be considered in acquiring the long-period sequences based on the state samples transferred between the base station and the mobile station. First is to reliably transfer the state samples to the receiving part in the CDMA channel environment having a very low SNR, and second is for the receiving part to perform the synchronization of the SRG using the transferred state samples.

Thus, according to the present invention, the igniter sequences are used for the transfer of the state samples and the synchronization of the SRG, and a synchronization technique of distributed sample scrambling (DSS) is applied.

Here, the igniter sequence is an auxiliary sequence introduced for helping the synchronization of the main sequences. This igniter sequence serves to reliably transfer the state values of main SRGs 11 and 12 to the receiving part (i.e., mobile station), and to provide a basis of timing for sampling and correction of the SRG state in the receiving part.

Meanwhile, by applying the DSS technique, the state samples of the main SRGs 11 and 12 in the transmitting part (i.e., base station) is distributed and transferred to main SRGs 43 and 44 of the receiving part, and thus the main SRGs 43 and 44 of the receiving part are gradually synchronized based on the state samples. According to the present invention, the synchronization is performed by applying the DSS technique that controls the main SRGs 43 and 44 of the receiving part according to the received state information of the main SRGs 11 and 12 of the transmitting part. This is similar to the existing acquisition method based on the state estimation, but is distinguished from the existing method in on the point that the synchronization is performed using the distributed state samples, rather than the continuous sample values (i.e., chip values).

Next, a partial construction of the cell asynchronous DS/CDMA system using the DSA technique will be explained in detail.

In FIG. 1, the base station (i.e., transmitting part) comprises a DSA spreading section 10 and a sample spreading section 20, and in FIG. 2, the mobile station (i.e., receiving section) comprises a sample despreading section 30 and a DSA despreading section 40.

The DSA spreading section 10 and the DSA despreading section 40 perform the synchronization of the main sequences, and the sample spreading section 20 and the sample despreading section 30 perform the transfer of the state samples. Their functions are implemented by main SRGs 11, 12, 43, and 44 provided in the DSA spreading section 10 and the DSA despreading section 40, respectively, and by igniter SRGs 24, 25, 32, and 33 provided in the sample spreading section 20 and the sample despreading section 30, respectively.

The DSA spreading section 10 in the base station illustrated in FIG. 1 comprises the two main SRGs 11 and 12 for producing a pair of main sequences, a time-advanced parallel sampling section 13 for sampling state samples of the main SRGs 11 and 12 in conformity with a timing of sampling, spreaders 14, 16, and 18 for spreading input user data to a quadrature Walsh code, and scramblers 15, 17, and 19 for scrambling again the user data signal spread to the quadrature Walsh code by complex type scrambling sequences.

Also, the sample spreading section 20 of the base station includes a QPSK symbol mapping section 21 for mapping the two state samples outputted from the time-advanced parallel sampling section 13 onto respective code symbols and outputting corresponding QPSK symbols, and a block, connected to the QPSK symbol mapping section 21, for performing a DPSK encoding. This block adds an accumulated phase till the previous symbol time to the phase of the QPSK symbol and outputs the state symbols which are the DPSK symbols. The sample spreading section 20 also includes the igniter SRGs 24 and 25 for producing the complex type igniter sequences in order to spread the produced DPSK symbols.

Figure 3:
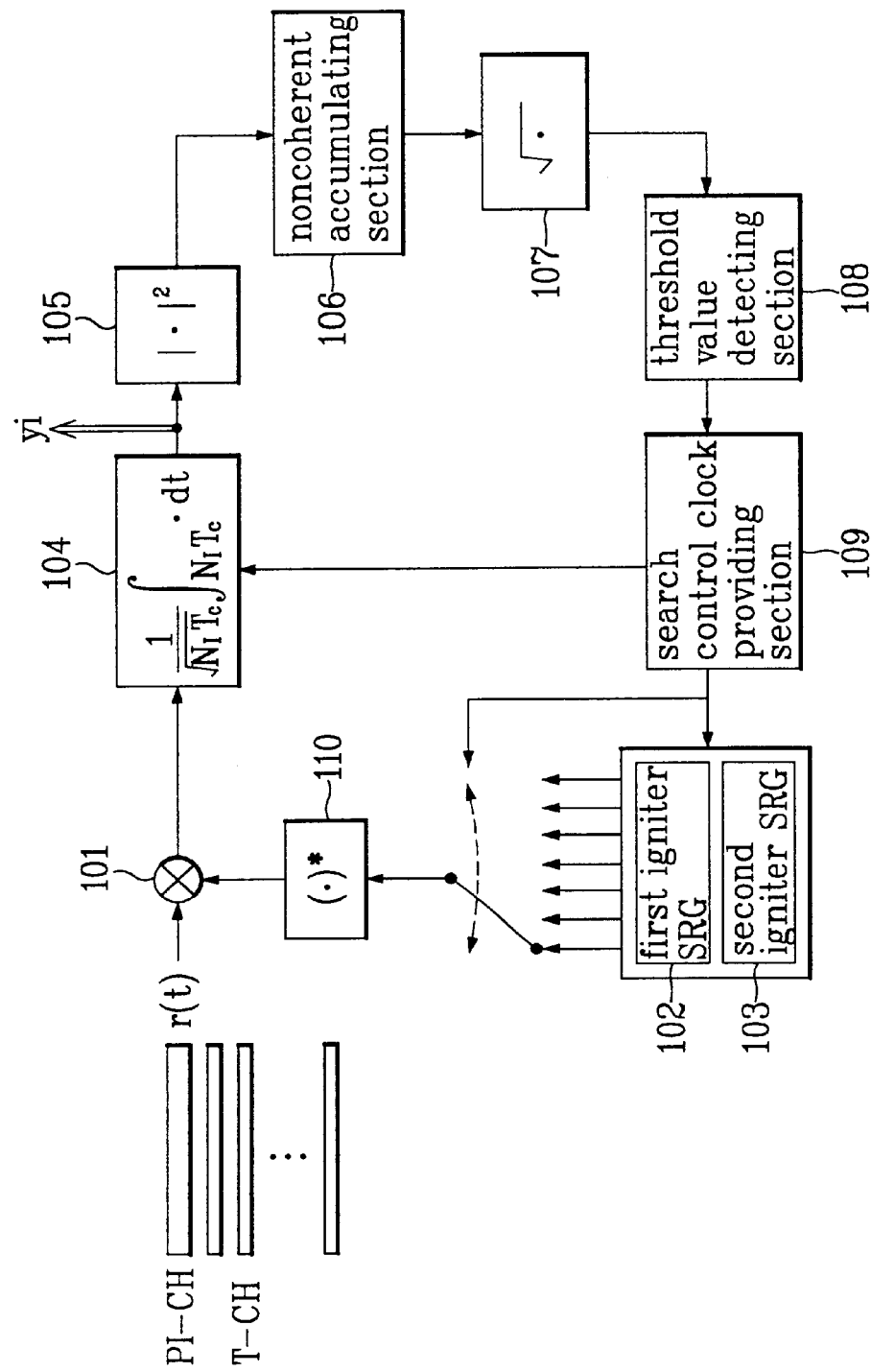
FIG. 3 is a block diagram illustrating a pure serial correlator among noncoherent acquisition detectors for obtaining the transmitted igniter sequences according to the present invention.
Figure 4:
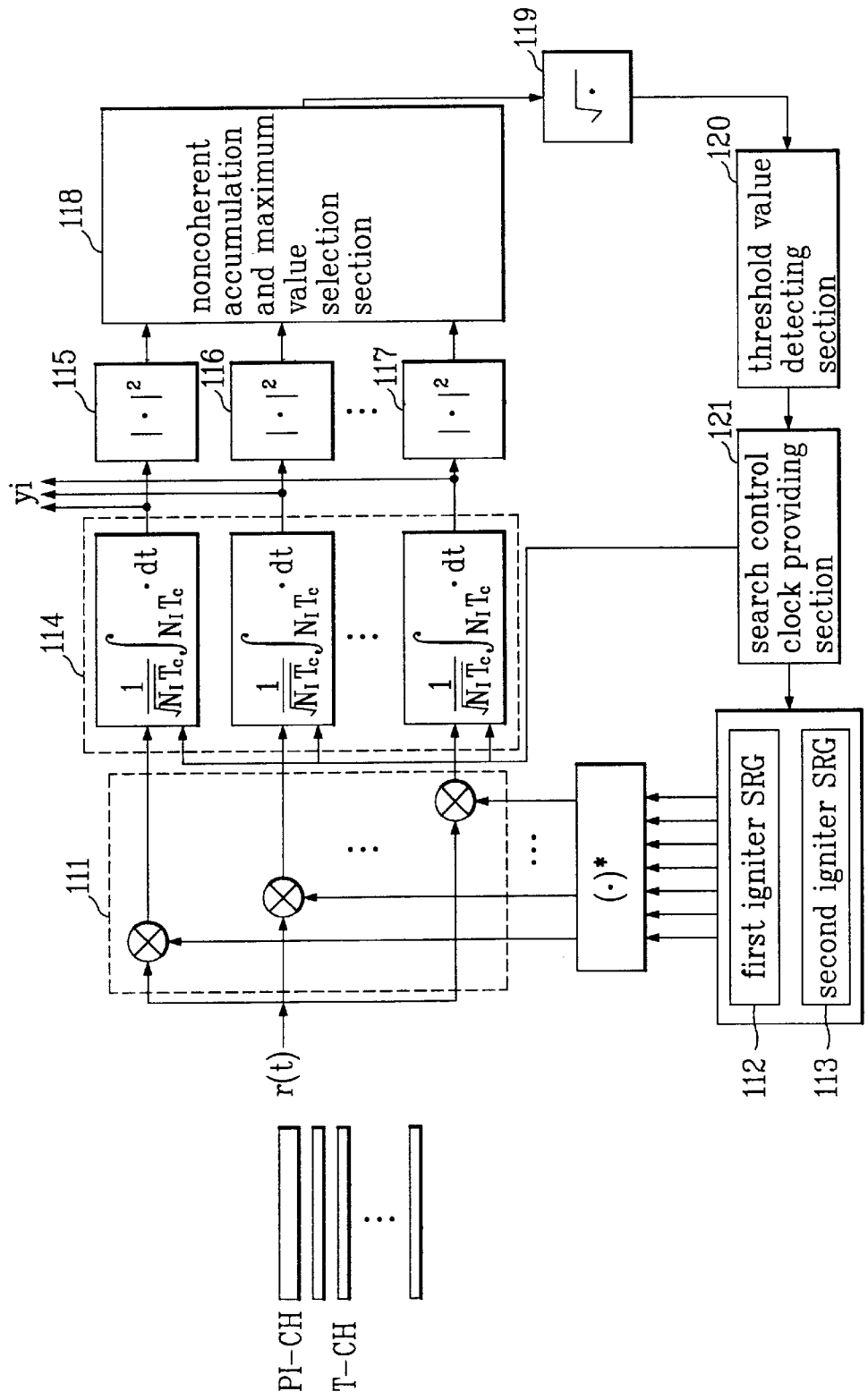
FIG. 4 is a block diagram illustrating a parallel correlator among noncoherent acquisition detectors for obtaining the transmitted igniter sequences according to the present invention.
Figure 5:
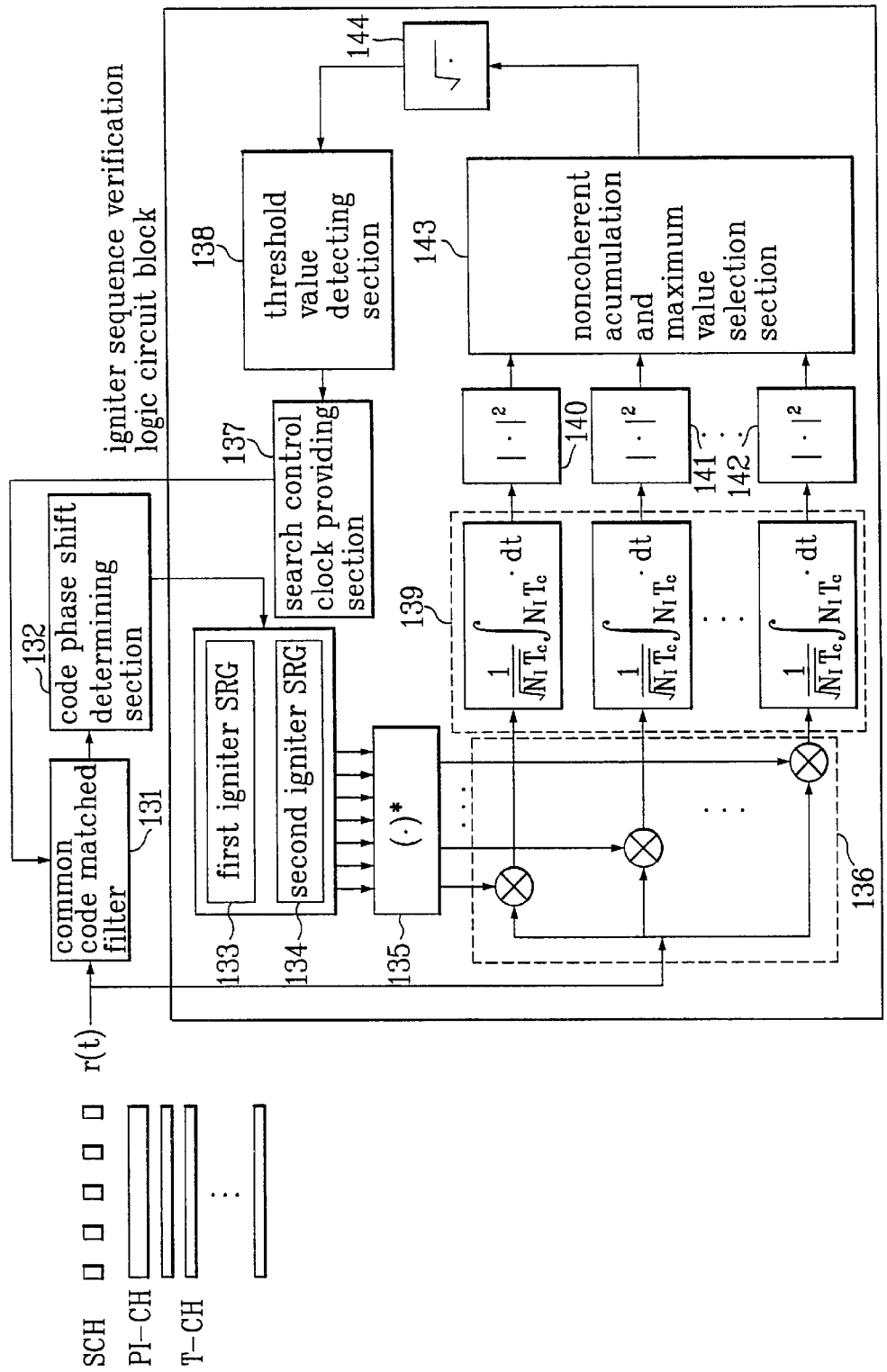
FIG. 5 is a block diagram illustrating a passive matched filter among noncoherent acquisition detectors for obtaining the transmitted igniter sequences according to the present invention.

The sample despreading section 30 of the mobile station illustrated in FIG. 2 includes a block for obtaining the igniter sequences first by using either of the noncoherent acquisition detectors illustrated in FIGS. 3 to 5. This block is basically provided with the igniter SRGs 32 and 33 for producing the igniter sequences, a despreader for despreading the state signals from the igniter sequences produced from the igniter SRGs 32 and 33, and a symbol correlation section 34 for performing a correlation detection with respect to the state signals despread from the igniter sequences. The sample despreading section 30 also includes a block, connected to the block for obtaining the igniter sequences, for performing a DPSK decoding, and a QPSK symbol demapping section 36 for demapping the symbols decoded by the block and outputting two state samples different from each other.

Also, the DSA despreading section 40 of the mobile station comprises two main SRGs 43 and 44 for producing a pair of main sequences, a parallel sampling section 45 for sampling state samples of the main SRGs 43 and 44 in conformity with a sampling timing provided from the igniter SRGs 32 and 33, a parallel comparing section 41 for comparing the two state samples outputted form the QPSK symbol demapping section 36 with the two state samples outputted from the parallel sampling section 45, and a parallel correction section 42 for repeatedly correcting the states of the main SRGs 43 and 44 as many as a predetermined number of times in accordance with a correction timing provided from the igniter SRGs 32 and 33 and a comparison result of the parallel comparing section 41. At this time, the main SRGs 43 and 44 make their states coincide with the states of the main SRGs 11 and 12 in accordance with outputs of the parallel correction section 42. The DSA despreading section 40 further includes a descrambler 46 for descrambling the received data signal from the complex type scrambling sequences produced from the main SRGs 43 and 44, a despreader 47 for despreading the signal descrambled by the scrambling sequences from the quadrature Walsh code, and a data symbol accumulating section 48 for accumulating the signal despread from the quadrature Walsh code in the unit of a data symbol.

Preferably, the high-speed cell searching apparatus using the distributed sample acquisition as constructed above may be all built in the mobile station, but in case of receiving the broadcasting signals from the base station, only the sample despreading section 30 and the DSA despreading section 40 are built in the mobile station.

The DSA spreading section 10 also includes a switch for selectively outputting a primary synchronization code (PSC) for effecting acquisition of the igniter sequences or the spread and scrambled user data.

Next, the high-speed cell searching apparatus according to the present invention will be explained in detail with reference to FIG. 1.

Referring to FIG. 1, in the base station, the main SRGs 11 and 12 having a length of L produce the scrambling sequences (Sm). Here, the scrambling sequence is the complex sequence having a period of $2^L-1$ or a short period that is composed of a part of the period, and is $S_{I,m}+jS_{Q,m}$.

Here, an I-phase component sequence $S_{I,m}$ of the scrambling sequence is a gold sequence formed by performing binary addition of the two main sequences produced from the main SRGs 11 and 12. At this time, the initial states of the first main SRGs 11 and 12 (i.e., internal values of shift registers having the length of L), i.e., the cell number of L bits of the first main SRG 11 and the cell number of L bits of the first main SRG 12 are determined to be all "1".

Also, a Q-phase component sequence $S_{Q,m}$ is a gold sequence formed by simply time-delaying the two main sequences for a predetermined chip and performing binary addition of the delayed main sequences, and can be produced from the same first main SRGs 11 and 12 by using properly designed sequence producing vectors.

Accordingly, in order to enable the mobile station to discriminate the cell where the mobile station is positioned and to obtain the timing of the scrambling sequence of the corresponding cell, a simultaneous synchronization for the first main SRGs 11 and 12 should be possible.

Also, in the base station, the first igniter SRGs 24 and 25 having a length of S produce the igniter sequences ($C_m$). Here, the igniter sequence $C_{I,m}+jC_{Q,m}$ is a period of $N_I=2^S$, and is used for spreading the state information of the first SRGs 11 and 12.

Here, an I-phase component sequence $C_{I,m}$ and a Q-phase component sequence $C_{Q,m}$ of the igniter sequence is a pair of quadrature gold sequences formed by performing binary addition of the two main sequences produced from the igniter SRGs 24 and 25.

Figure 6:
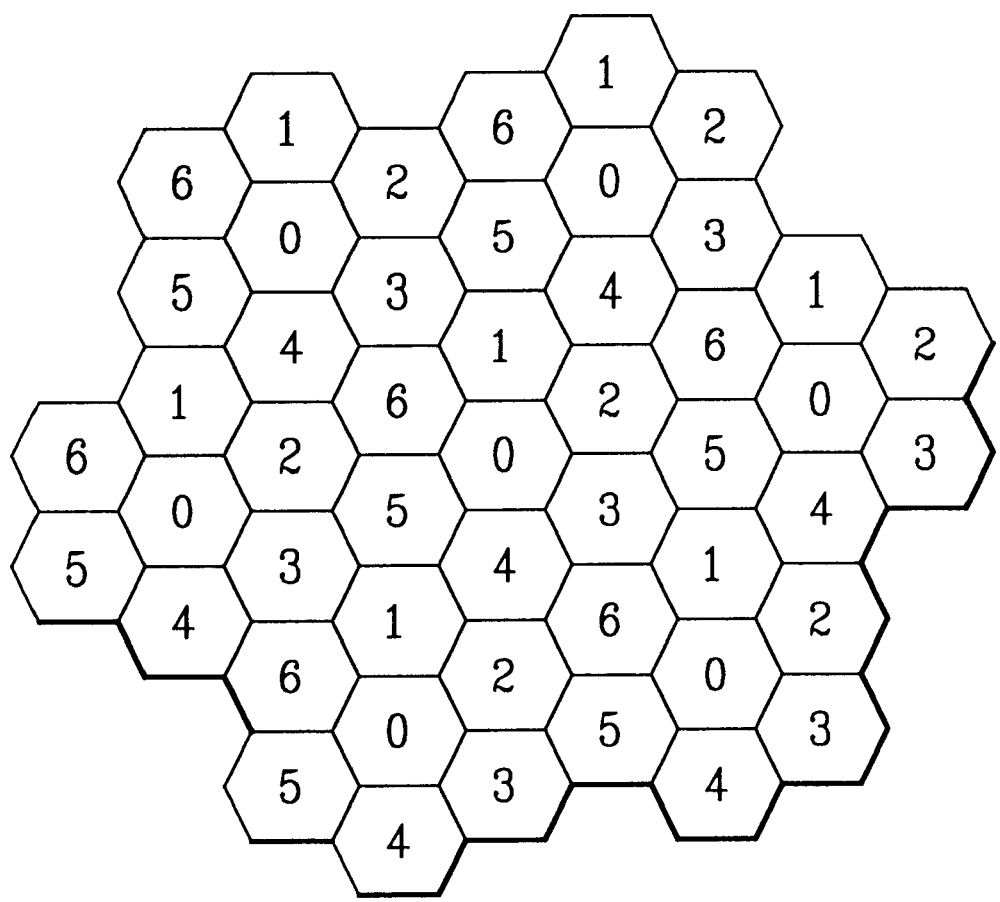
FIG. 6 is a view illustrating an example of a pattern for re-using igniter sequences when cells are grouped by the igniter sequences according to the present invention.

The number of quadrature gold sequences which can be produced form the first igniter SRGs 24 and 25 having the length of S is $2^S$. However, in the cellular system, sequences the number of which is only 2R (i.e., R pairs of I-phase component igniter sequences and Q-phase component igniter sequences) are used. Here, R denotes a re-use factor of the igniter sequences in the system. FIG. 6 illustrates a re-use pattern of the igniter sequences where R=7. The kind (i.e., number) of the igniter sequences to be used can be determined by spatial division.

Then, in the base station, the time-advance parallel sampling section 13 obtains the state samples $Z_i^{(j)}$ (J=1,2) from the outputs of the first main SRGs 11 and 12 at the time point of $(r+I-1)N_I$ with respect to a reference value r using the sampling timing provided from the first igniter SRGs 24 and 25 (I=0,1,2, . . . ,L−1). Here, the sampling timing provided from the first igniter SRGs 24 and 25 is for determining every time point during sampling. Thereafter, the state samples $Z_i^{(j)}$ are provided to the QPSK symbol mapping section 21 for the DPSK modulation.

At this time, the obtained state sample values are main sequence values to be produced from the main SRGs 11 and 12 at the time point of $(r+I)N_I$, and this is because the time-advance parallel sampling section 13 samples the state samples $Z_i^{(j)}$ to be produced from the main SRGs 11 and 12 at the time point of $(r+I)N_I$ in advance at the time point of $(r+I-1)N_I$.

The QPSK symbol mapping section 21 maps the two provided state samples with the respective code symbols and outputs corresponding state symbols $X_i$ which are the QPSK symbols. Then, the block following the QPSK symbol mapping section 21 performs the DPSK encoding. At this time, DPSK symbols $f_i$ are produced by adding the phase accumulated till the previous symbol time to the phase of the QPSK symbols $X_i$.

As a result, the DPSK symbols $f_i$ are spread by the complex type igniter sequences ($C_m$) produced from the igniter SRGs 24 and 25 and then transmitted to the mobile station through a pilot channel PI-CH at predetermined intervals. This is the state signal.

On the contrary, in the base station, respective M-ray user data ($a_i^{(1)}, a_i^{(2)}, \ldots, a_i^{(J)}$) is spread to quadrature Walsh code ($W_m^{(1)}, W_m^{(2)}, \ldots, W_m^{(J)}$) and then scrambled by the scrambling sequence ($S_m$) commonly used for the respective user data in the base station to be transmitted to the mobile station through the traffic channel T-CH. This is the data signal.

Referring to FIG. 2, the mobile station, which receives the transmitted state signal and data signal, first obtains the igniter sequences using either of the noncoherent acquisition detectors illustrated in FIGS. 3 to 5.

The noncoherent acquisition detectors illustrated in FIGS. 3 to 5 respectively have merits and demerits. The hardware implementation of the pure serial correlator of FIG. 3 is simplified, but its acquisition speed is low. The hardware implementation of the passive matched filter of FIG. 5 is complicated, but its acquisition speed is high. The parallel correlator of FIG. 4 has an average performance in hardware implementation and acquisition speed in comparison to the detectors as described above.

According to the present invention, the state signal produced by spreading the DPSK symbols $f_i$ by the igniter sequences ($C_m$) is transferred to the mobile station through the pilot channel PI-CH, and if no separate synchronization channel SCH exists, the pure serial correlator of FIG. 3 or the parallel correlator of FIG. 4 is used.

On the contrary, if it is intended to obtain the timing of the igniter sequences ($C_m$) using a separate synchronization channel SCH, the passive matched filter of FIG. 5, which declares the timing synchronization at the time point where the maximum correlation value of the common PN sequences for spreading the synchronization channel is detected, is used.

In case that the pure serial correlator of FIG. 3 is used, the mobile station should discriminate (i.e., discriminate) the current cell group, or the corresponding igniter sequences. Simultaneously, the mobile station should search the igniter code timing. Thus, the mobile station uses the serial searching method for correlating the received igniter sequences by changing the R igniter sequences. From the viewpoint of the acquisition process, it is identical to the code timing search of the PN sequences having the period of $RN_I$.

In case that the parallel correlator of FIG. 4 is used, the R correlators 34 operate in parallel to search the different igniter sequences having the length of $N_I$. Accordingly, the actual search time is greatly reduced.

The pure serial correlator of FIG. 3 operates as follows.

A sequence switch sequentially switches igniter codes produced from two igniter SRGs 102 and 103. Then, the pure serial correlator performs the search based on the correlation as it shifts a round with respect to the respective codes until the output of a symbol correlation section 104 exceeds a predetermined threshold value $R_0^2$, and a decision logic circuit declares the in-phase state.

If the in-phase state is once declared, the process of verifying the pairs of the igniter sequences starts, and at this time, the present igniter code and the shift state is maintained as they are.

At the igniter sequence verifying step, energies of the despread state symbols are noncoherently added $V_I$ times, and then compared with another predetermined threshold value $R_1^2$. If the added energy does not exceed the threshold value $R_1^2$, the igniter sequence searching process is re-performed, starting from a shifted state by a predetermined phase (generally, half a chip). If the added energy exceeds the threshold value $R_1^2$, the igniter sequence discrimination and synchronization process is completed, and then a correlation process for the main SRGs to be explained later starts.

Meanwhile, a search control clock providing section 109 in the pure serial correlator of FIG. 3 provides a clock signal related to the igniter code production of the igniter SRGs 102 and 103 and the correlation process of the symbol correlation section 104 according to a result of correlation.

Now, the parallel correlator and the passive matched filter illustrated in FIGS. 4 and 5 will be explained.

The parallel correlator of FIG. 4 has the structure wherein R correlators constituting the symbol correlation section 114 are arranged in parallel, and the maximum values of the R correlator outputs are compared with the predetermined threshold value. The operation of the parallel correlator having the R correlators arranged in parallel is similar to that of the pure serial correlator of FIG. 3, but the parallel correlator can perform a rapid acquisition.

In case of periodically broadcasting the common code added for obtaining a more rapid acquisition time through the synchronization channel SCH, the igniter sequence timing can be acquired using the passive matched filter structure illustrated in FIG. 5. As described above, however, the use of the passive matched filter increases the complexity of implementation, and thus, according to the present invention, the complexity of implementation is reduced to a satisfied level through a careful code selection and proper matched filter design.

The peculiar point of the passive matched filter is that a common code matched filter 131 and a code phase shift determining section 132 are provided to acquire the timing of the igniter sequence from the common code periodically received through the synchronization channel SCH.

Meanwhile, in case of using the parallel correlator or the passive matched filter as above, a process of discriminating the igniter code should be included when the igniter sequences are verified. This process can be implemented by employing noncoherent accumulation and maximum value selection sections 118 and 143 illustrated in FIGS. 4 and 5, and by determining the igniter code which corresponds to the detection of the maximum energy during the verification process.

Referring to FIG. 2, if the igniter code and the igniter code timing of the present cell are obtained as the igniter sequence verification is achieved, i.e., the igniter sequence timing is fixed, an output yi of a symbol accumulating section 34, which is despread to the complex type-igniter sequences $C_m$ produced from the igniter SRGs 32 and 33, and declared as is in the in-phase state by the decision logic circuit, is DPSK-decoded at the following stage, and inputted to the QPSK symbol demapping section 36.

The QPSK symbol demapping section 36 detects two different state sample values $Z_i^{(1)}$ and $Z_i^{(2)}$ by demapping the decoded symbols for the state correction of the second main SRGs 43 and 44. These sample values pass through the DSA despreading section 40 at the time point of $(r+I)N_f$.

Next, the parallel comparing section 41 of the DSA despreading section 40 compares the inputted sample values $Z_i^{(1)}$ and $Z_i^{(2)}$ with the state sample values Z-bar$_i^{(1)}$ and Z-bar$_i^{(2)}$ provided from the parallel sampling section 45. Here, the parallel sampling section 45 samples the pair of the main sequences simultaneously produced from the second main SRGs 43 and 44 in conformity with the sampling timing provided from the second igniter SRGs 32 and 33 at the time point of $(r+I)N_f$.

Here, if $Z_i^{(1)}$ (j=1,2) does not coincide with Z-bar$_i^{(1)}$ (j=1,2), the parallel correction section 42, for the state correction of one or two main SRGs corresponding to the inconsistent sample pair among the second main SRGs 43 and 44, is triggered at the time point $(r+I)N_f+D_c$ including $D_c$ selected to satisfy $0<D_c \leq N_f$. However, if $Z_i^{(1)}$ (j=1,2) coincides with Z-bar$_i^{(1)}$ (j=1,2), the parallel correction section 42 does not perform any operation.

In the present invention, if a pair of a sampling circuit and a correction circuit are independently designed and used for the second main SRGs 43 and 44, the second main SRGs 43 and 44 of the mobile station transfer the L state symbols and are synchronized with the first main SRGs 11 and 12 of the base station on the assumption that no error is detected.

If an error is detected, according to the present invention, a verification process for the main sequences is performed in a manner that it is checked whether the transferred symbols coincide with the symbols produced in the receiving part through the comparison of V symbols after the synchronization.

Meanwhile, while the state correction and verification process of the main SRGs is performed, i.e., during the transmission period of the symbols the number of which is L+V, the mobile station noncoherently accumulates the energies of the despread state symbols for re-discriminating whether the igniter sequences are correctly synchronized. If the transferred symbols actually coincide with the symbols produced in the receiving part for all the V symbol pairs, the mobile station indicates that the synchronization of the main sequences is completed, and thus the synchronization of the scrambling sequences is completed. If the synchronization is completed, the mobile station traces and estimates the following channel gain and carrier phase.

However, if the transferred symbols coincide with the symbols produced in the receiving part only for the symbol pairs less than V, and the value obtained by noncoherently accumulating the energies of the despread state symbols is larger than the predetermined threshold value $R_2^2$, the mobile station re-performs the state correction process of the main SRGs.

Also, if the transferred symbols coincide with the symbols produced in the receiving part only for the symbol pairs less than V, and the value obtained by noncoherently accumulating the energies of the despread state symbols is smaller than the predetermined threshold value $R_2^2$, the mobile station re-performs the igniter sequence searching process.

Figure 7:
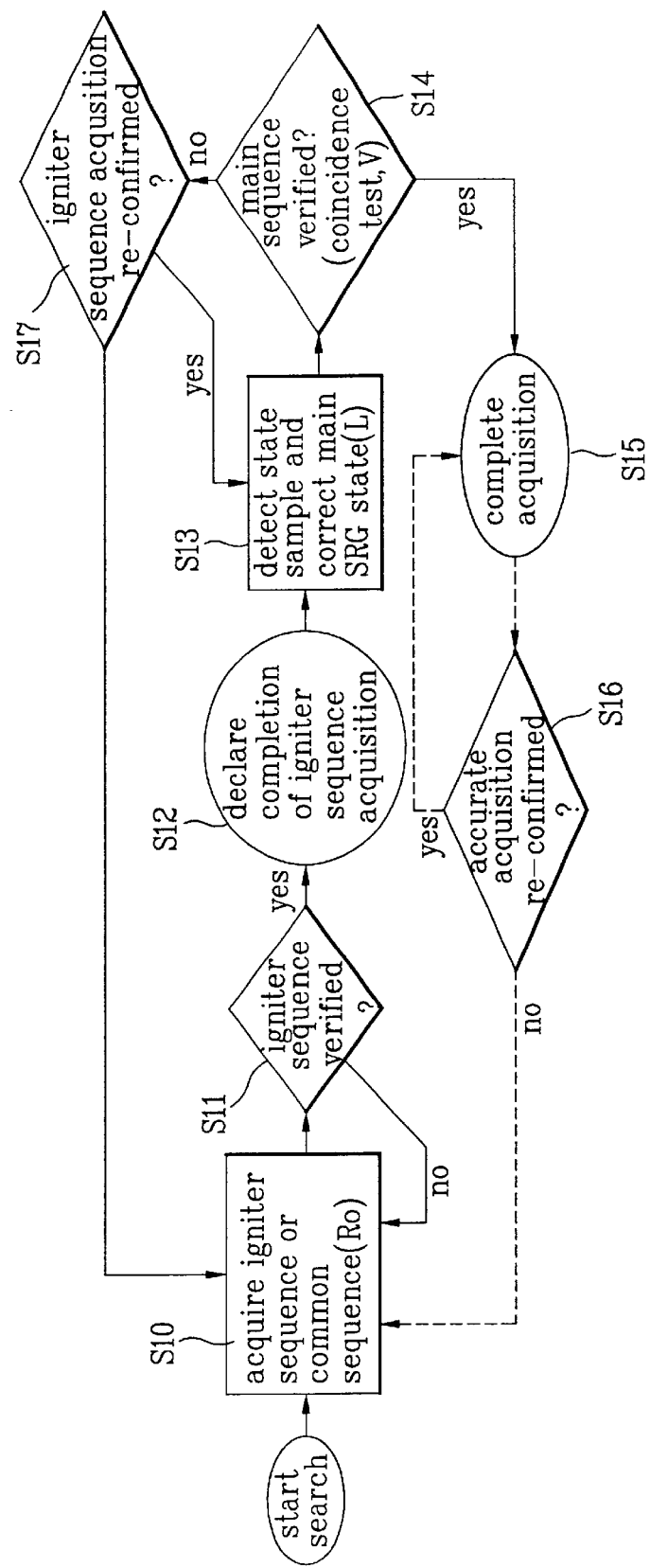
FIG. 7 is a flowchart illustrating the whole process for cell search using a DSA in a cell asynchronous DS/CDMA system according to the present invention.

FIG. 7 is a flowchart illustrating the whole process for cell search using the DSA in the cell asynchronous DS/CDMA system according to the present invention, and all the acquisition processes explained till now are illustrated as a solid line in FIG. 7.

First, the mobile station acquires the igniter sequences (i.e., igniter codes) by comparing them with the predetermined threshold value $R_0$ (step S10). At this time, if the mobile station uses the passive matched filter illustrated in FIG. 5, the common sequence (i.e., common code) is first acquired.

Thereafter, the igniter sequence acquisition is verified through the comparison with another predetermined threshold value $R_1$ (step S11). Here, if the igniter sequence acquisition is verified, the completion of the igniter sequence acquisition is declared (step S12), while if the verification fails, the sequence searching process is re-performed to acquire the igniter sequences.

After the synchronization process by the igniter sequence acquisition and verification is successfully completed, the main sequences are acquired by the state sample detection of the first main SRGs 11 and 12 of the corresponding cell, i.e., the base station, and state correction of the second main SRGs 43 and 44 of the mobile station using the result of state sample detection (step S13).

Then, the main sequence acquisition is verified through V times experiments (for detecting whether the two main SRG pairs of the base station and the mobile station coincide with each other) (step S14). If the main sequence acquisition is verified, the completion of the main sequence acquisition is declared (step S15), while if the verification fails, the igniter sequence acquisition is re-discriminated (step S17).

Even if the verification of the main sequence acquisition is successful, there still exists a possibility of the acquisition error. Thus, a process of re-discriminating whether the main sequences are accurately acquired by observing if the verification result satisfies the performance level required after the declaration of the acquisition completion is added (step S16). At this time, if the verification result does not satisfy the required performance level through the re-discrimination of the acquisition, the first sequence acquisition step (step S10) is re-performed.

Meanwhile, in case that the verification of the main sequence acquisition fails, it is re-discriminated whether the igniter sequence acquisition is accurate (step S17). If it is judged that the igniter sequences are accurately acquired, the main sequence acquisition step is re-performed through the state sample detection of the corresponding cell and the state correction of the second main SRGs 43 and 44 of the mobile station (step S13), while if it is judged that the igniter sequences are not accurately acquired, the first sequence acquisition step (step S10) is re-performed.

After all the cell searching procedure as above is completed, the mobile station despreads the data signal by multiplying the data signal by the scrambling sequences produced by the synchronized main sequences and conjugate values of the corresponding Walsh sequences for every user, and coherently demodulates the despread data signal using a result of channel estimation. Here, the channel estimation result is obtained using the igniter sequences and the main sequences of the mobile station that is synchronized with the input state signal.

Thereafter, the mobile station may reproduce the state signal broadcasted in a state that it has an initial phase ambiguity only related to a DPSK modulator. However, if the igniter sequences and the main sequences of the mobile station and the base station are synchronized, respectively, the channel estimation is performed in a similar manner to the existing channel estimation performed using the pilot sequences not modulated in the general DS/CDMA system.

In the channel estimation, it is important to solve the phase ambiguity problem which may be produced when the DPSK-modulated pilot is used. However, the channel estimation is not directly related to the present invention, and the detailed explanation thereof will be omitted.

Next, synchronization parameters used when designing a circuit for sampling and correcting the main sequences will be explained.

First, at the m time point, it is defined that state vectors of the first main SRGs 11 and 12 of the base station is $d_m^{(j)}$ (j=1,2), and state vectors of the second main SRGs 43 and 44 of the mobile station is d-bar$_m^{(j)}$ (j=1,2). And a corresponding state transition matrix related to two sequential vectors is defined as $T_j$ as shown in the following equation 1.

$$d_{m+1}^{(j)} = T_j \cdot d_m^{(j)},$$

or $$\bar{d}_{m+1}^{(j)} = T_j \cdot \bar{d}_m^{(j)} \quad \text{[Equation 1]}$$

Also, as shown in the following equation 2, sequence producing vectors used for deriving main sequence values $d_m^{(j)}$ or d-bar$_m^{(j)}$ from the relation between the state vectors $S_{I,m}^{(j)}$ or S-bar$_{I,m}^{(j)}$ (j=1,2) are defined as $h_j$.

$$S_{I,m}^{(j)} = h_j^t \cdot d_m^{(j)},$$

or $$\bar{S}_{I,m}^{(j)} = h_j^t \cdot \bar{d}_m^{(j)} \quad \text{[Equation 2]}$$

And, correction vectors for correcting the previous state vectors d-bar$_{old}^{(j)}$ to new state vectors d-bar$_{new}^{(j)}$ through the relation of the following equation 3 are defined as $C_j$ (j=1,2).

$$\bar{d}_{new}^{(j)} = \bar{d}_{old}^{(j)} + (Z_i^{(j)} + \bar{Z}_i^{(j)}) C_j \quad \text{[Equation 3]}$$

As already explained, the state samples $Z_i^{(j)}$ and Z-bar$_i^{(j)}$ (j=1,2, and I=0,1,2 . . . , L-1) are the main sequence values produced from the main SRGs 11, 12, 43, and 44 of the base station and the mobile station at the time point of $(r+I)N_I$, and the state correction of the main SRGs is performed at the time point of $(r+I)N_I + D_c$ including $D_c$ selected to satisfy $0 < D_c \leq N_1$. Accordingly, the state samples $Z_i^{(j)}$ and Z-bar$_i^{(j)}$ relate to the state vectors as shown in the following equation 4.

$$Z_i^{(j)} = S_{(r+i)N_I}^{(j)} = h_j^t \cdot d_{(r+i)N_I}^{(j)},$$

or $$\bar{Z}_i^{(j)} = \bar{S}_{(r+i)N_I}^{(j)} = h_j^t \cdot \bar{d}_{(r+i)N_I}^{(j)} \quad (i=0,1,2,\ldots,L-1) \quad \text{[Equation 4]}$$

And, the state vectors during the state correction are expressed by the following equation 5.

(a) $d_{(r+i)N_I+D_c}^{(j)} = T_j \cdot d_{(r+i)N_I+D_c-1}^{(j)}$ (b) $\bar{d}_{(r+i)N_I+D_c}^{(j)} = T_j \cdot \bar{d}_{(r+i)N_I+D_c-1}^{(j)} + (Z_i^{(j)} + \bar{Z}_i^{(j)}) C_j \quad$ [Equation 5]

In the complex type scrambling sequence $S_m (= S_{I,m} + jS_{Q,m})$, the I-phase component sequence obtained $S_{I,m}$ by performing a binary addition of the two main sequences and the Q-phase component sequence $S_{Q,m}$ obtained by shifting the I-phase component sequence for a predetermined time are obtained when the two state vectors $d_m^{(j)}$ (j=1,2) of the base station are identical to the state vectors d-bar$_m^{(j)}$ (j=1,2) of the mobile station. Thus, according to the present invention, the DSA technique applied to one main sequence is developed to be suitably applied to a main sequence pair, so that the j-th time-advanced sampling vector $V_j$ and j-th correction vector $C_j$ are obtained.

Next, a process of designing synchronization parameters will be explained.

According to the present invention, the j-th discrimination matrix $\Delta T_j h_j$ (j=1,2), which is a matrix of L×L, is defined by the following equation 6.

$$\Delta_{T_j,h_j} [h_j (T_j^{N_I})^t \cdot h_j (T_j^{2N_I})^t \cdot h_j \ldots (T_j^{(L-1)N_I})^t \cdot h_j]^t \quad \text{[Equation 6]}$$

If the period $N_I$ of the igniter sequence is selected as a value relatively prime to $2^L - 1$, $\Delta T_1 h_1$ and $\Delta T_2 h_2$ become a nonsingular matrix. According to the present invention, if the igniter sequence is first selected to satisfy the above condition, the correction vector $C_j$ and the time-advanced sampling vector $V_j$ are determined by the following equations 7 and 8.

$$C_j = T_j^{(L-1)N_I + D_C} \cdot \Delta_{T_j,h_j}^{-1} \cdot e_{L-1} \quad \text{[Equation 7]}$$

$$v_j = (T_j^{N_I})^{t} \cdot h_j \quad \text{[Equation 8]}$$

In equation 7, $e_i$ (I=0,1, ..., L-1) is an L-vector, and is the I-th standard reference vector. Here, I-th component is 1, and other components are 0 in all.

The simultaneous synchronization for the first main SRGs of the base station and the mobile station achieved by the above-described method enables the mobile station to discriminate the cell where the mobile station is currently positioned very effectively and to obtain the timing of the main sequences (i.e., scrambling code timing) of the corresponding cell. This synchronous synchronization obtains the main sequence timing by simultaneously transferring the state samples $Z_i^{(1)}$ and $Z_i^{(2)}$ in the form of a state symbol.

For instance, if the cellular system is composed of 512 cells and each cell belongs to one among 7 cell group (i.e., R=7) as the igniter re-use pattern of FIG. 6, the complex scrambling sequence of the system is divided into 512 I-phase component sequences by cutting only as many as 38,400 chips a set of gold sequences formed by performing a binary addition of the two main sequences. Here, respective specified polynomials are expressed by the following equation 9.

$$\psi_1(x) = x^{18} + x^7 + 1$$

$$\psi_2(x) = x^{18} + x^{10} + x^7 + x^5 + 1 \quad \text{[Equation 9]}$$

Also, the state conversion matrices $T_1$ and $T_2$ of the respective first main SRGs and second main SRGs, and the sequence production vectors $h_1$ and $h_2$ are given by the following equation 10. In equation 10, $I_{17 \times 7}$ denotes a 17×17 identity matrix.

$$T_j = \begin{bmatrix} 0 & I_{17 \times 17} \\ 1 & t_j \end{bmatrix}, j = 1, 2 \quad \text{[Equation 10]}$$

$t_1 = [0\ 0\ 0\ 0\ 0\ 0\ 1\ 0\ 0\ 0\ 0\ 0\ 0\ 0\ 0\ 0\ 0]$ $t_2 = [0\ 0\ 0\ 0\ 1\ 0\ 1\ 0\ 0\ 1\ 0\ 0\ 0\ 0\ 0\ 0\ 0]$ $h_1 = h_2 = [1\ 0\ 0\ 0\ 0\ 0\ 1\ 0\ 0\ 0\ 0\ 0\ 0\ 0\ 0\ 0\ 0]^t$

The I-phase component sequence in the scrambling sequence of the k-th (k=0,1, ... 511) cell is determined by an equation whereby the cell number of 18 bit strings (for example, binary value of k+1) is given to one of the first main SRGS, and the 18 bit string composed of binary values of 1 is given to the other of the first main SRGs. And, the states of the SRGs proceed according to the system clock signal of the base station.

Also, the Q-phase component sequence in the scrambling sequence of the respective cell is produced by simply delaying the I-phase component sequence for a time corresponding to 131,072 chips. This can be easily produced from the first SRGs using the time-advanced production vector $h^j = (T_j^{131,072})^t \cdot h_j (j=1,2)$. As a result, the production vector of the Q-phase component sequence is given by the following equation 11.

$h_1 = [0\ 0\ 0\ 0\ 1\ 0\ 1\ 0\ 0\ 0\ 0\ 0\ 0\ 0\ 1\ 0\ 0]^t$ $h_2 = [0\ 0\ 0\ 0\ 0\ 1\ 1\ 0\ 1\ 1\ 1\ 1\ 1\ 1\ 1\ 1\ 0\ 0]^t \quad \text{[Equation 11]}$ Next, the states of the first main SRGs proceed to 38,400 chips, and then redetermined as their initial values. That is, the cell number and bit string composed of binary values of 1 are initially determined.

Meanwhile, 7 (R=7) pairs of the I-phase component sequence and the Q-phase component sequence are obtained from 256 sets of quadrature gold sequences having the period of 256. They are produced by performing the binary addition of the two main sequences of the 255 period, and an extra value of 0 is inserted onto a respective sequence head. Also, respective specified polynomials of the two main sequences for producing the igniter sequences of the respective components are given by the following equation 12.

$$I_1(x) = x^8 + x^4 + x^3 + x^2 + 1$$

$$I_2(x) = x^8 + x^6 + x^5 + x^3 + 1 \quad \text{[Equation 12]}$$

Figure 8:
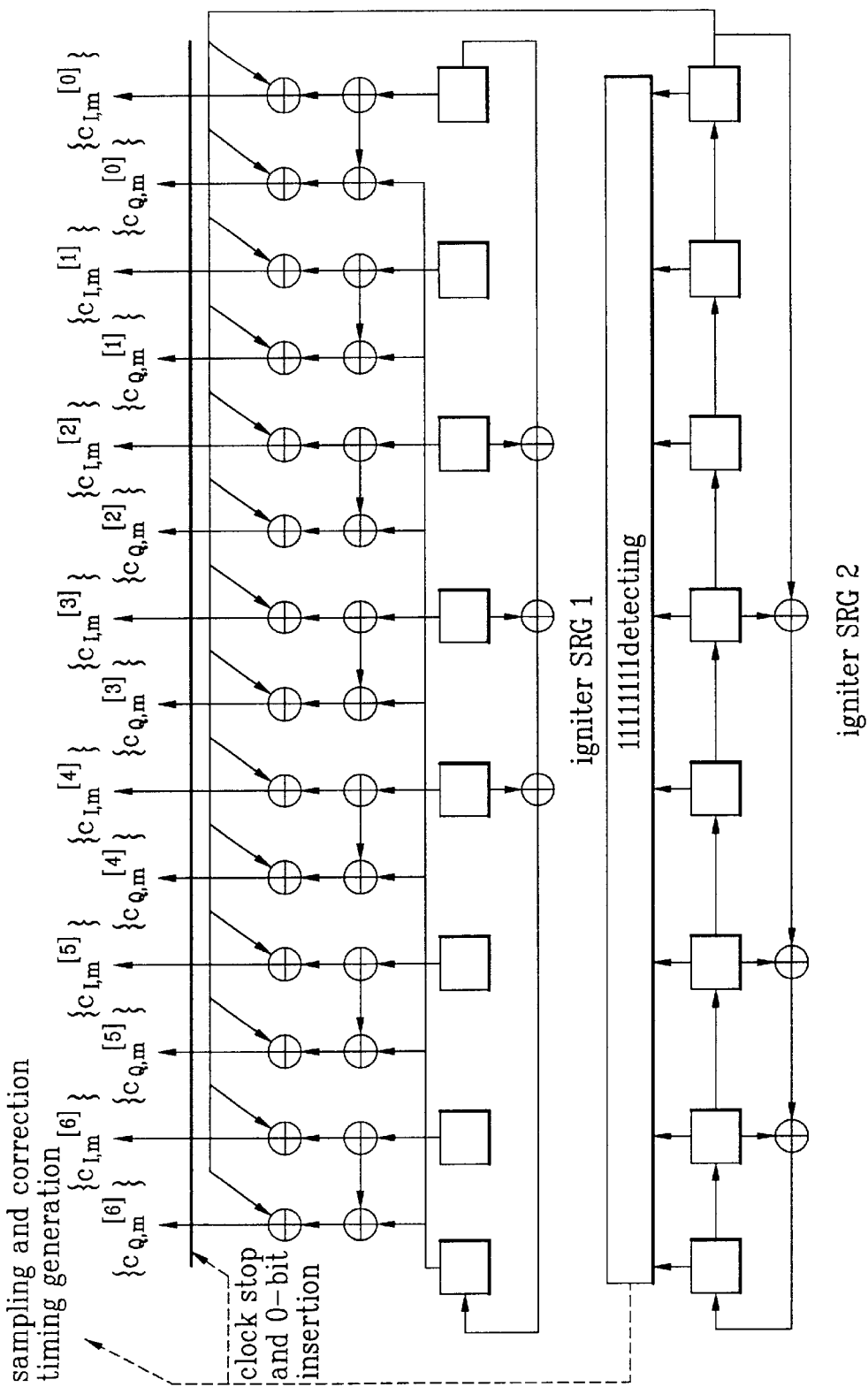
FIG. 8 is a view illustrating an example of an igniter SRG for producing different orthogonal gold sequences of a complex type.

The initial states of the first igniter SRGs are determined as "00000001" and "11111111", respectively. Here, whenever the state of one of the first igniter SRGs becomes "11111111", 0-bit insertion is performed. Also, in order to obtain 7 pairs of different complex type quadrature gold sequences, the 14 production vectors (or 7 pairs of vectors) obtain 7 pairs of main sequences from one of the first igniter SRGs as the states of the SRGs are shifted in time, and perform the binary addition of the 7 pairs of main sequences and 7 pairs of main sequences obtained from the other of the first igniter SRGs. The igniter SRG for obtaining the 7 pairs of different complex type quadrature gold sequence is illustrated in FIG. 8.

The respective base station uses only a pair of quadrature gold sequences allocated to the corresponding cell group. On the contrary, the mobile station uses 7 pairs of quadrature gold sequences sequentially or simultaneously at the acquisition step.

For the main SRG having the length of L=18 and the igniter sequence of $N_I$=256, the period of the igniter sequence (i.e., interval of sampling) is relatively prime to $2^{18}-1$. Accordingly, the discrimination matrix $X_{T_j,h_j}$ (j=1,2) is determined by the equation 6 to be a nonsingular matrix.

Also, according to the present invention, if the correction delay $D_c$ for state correction is 1, the correction vector $C_j$ and the time-advanced sampling vector $V_j$ according to the equations 7, 8, and 10 are obtained as the following equation 13.

Figure 9:
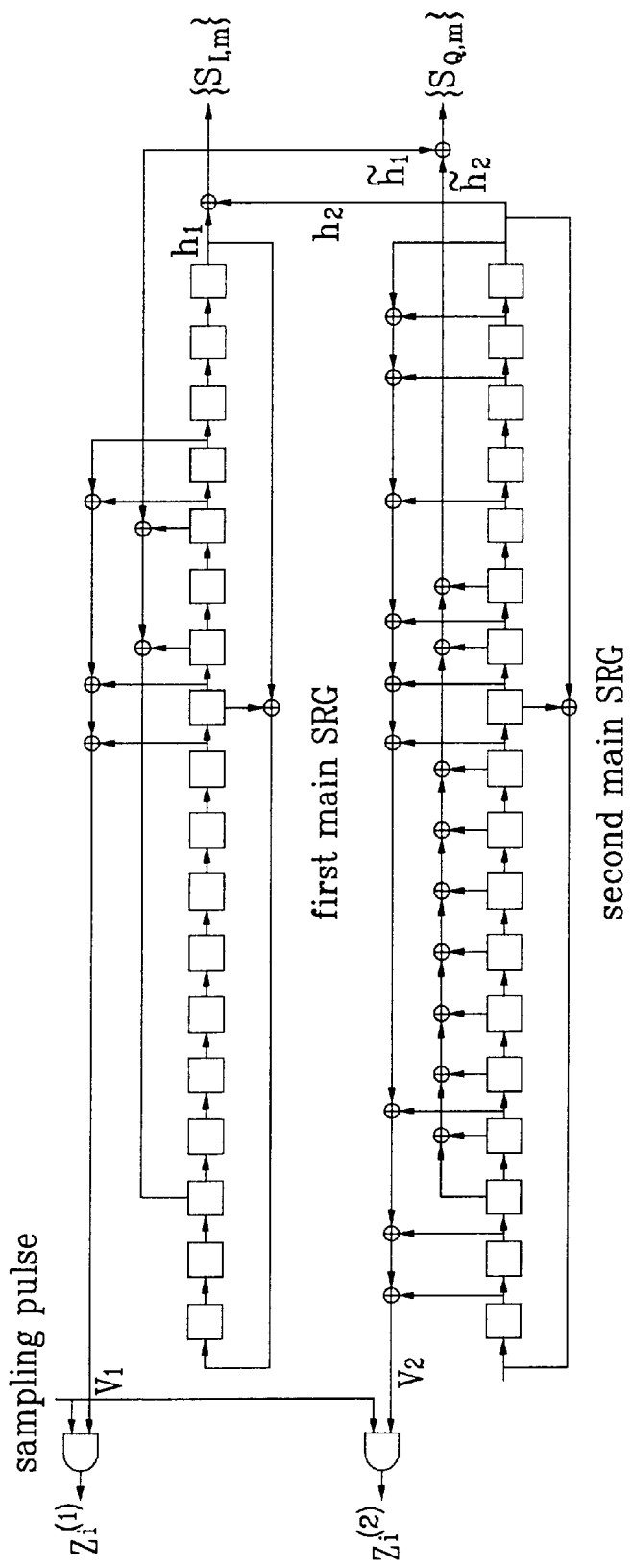
FIG. 9 is a view illustrating the construction of a main SRG of the base station side produced by combining a sample vector and a correction vector according to the present invention.
Figure 10:
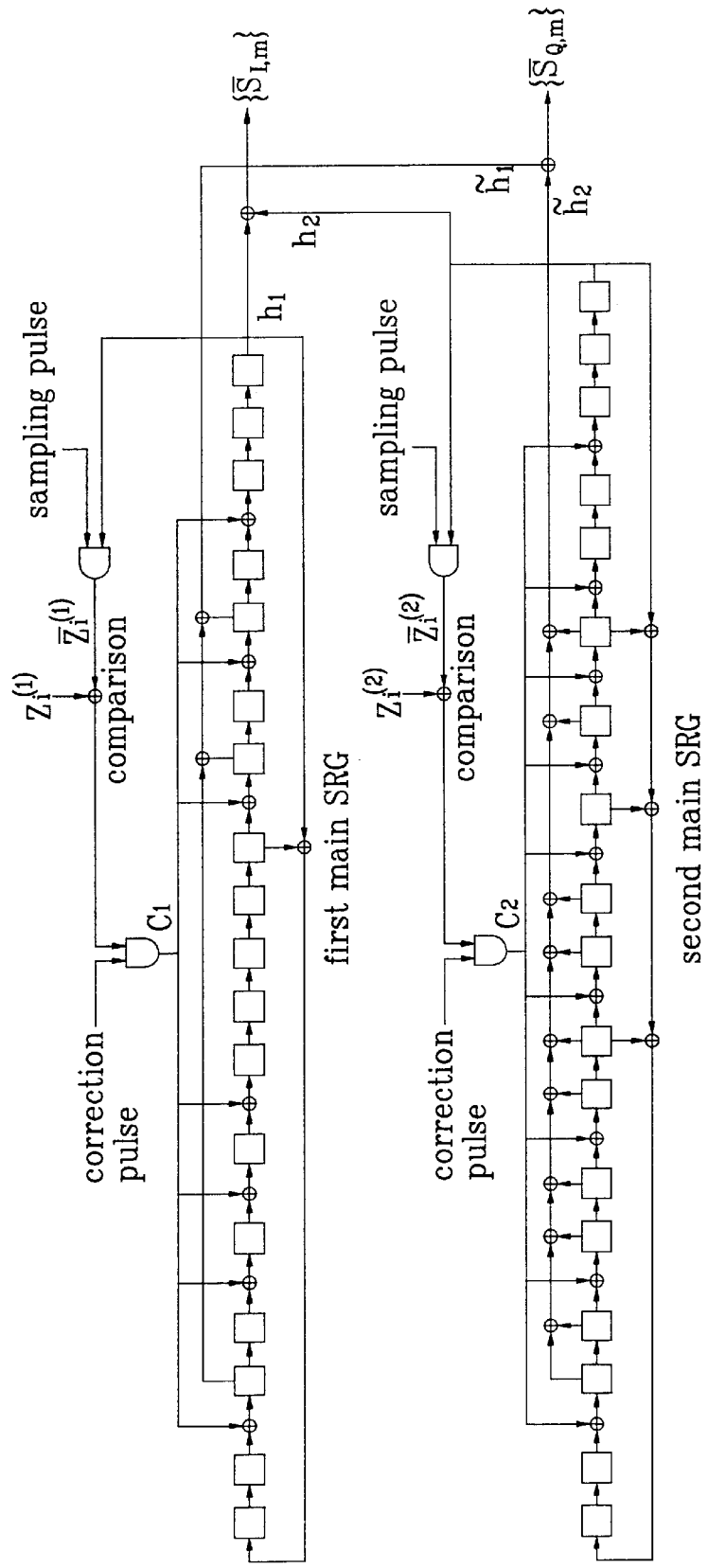
FIG. 10 is a view illustrating the construction of a main SRG of the mobile station side produced by combining a sample vector and a correction vector according to the present invention.

$c_1 = [0\ 0\ 1\ 0\ 1\ 0\ 1\ 0\ 0\ 0\ 0\ 1\ 1\ 1\ 0\ 1\ 0\ 0]^t$ $c_2 = [0\ 0\ 1\ 0\ 1\ 1\ 1\ 1\ 0\ 1\ 0\ 1\ 0\ 1\ 0\ 1\ 0\ 0]^t$ $v_1 = [0\ 0\ 0\ 1\ 1\ 0\ 0\ 1\ 1\ 0\ 0\ 0\ 0\ 0\ 0\ 0\ 0\ 0]^t$ $v_2 = [1\ 1\ 1\ 0\ 1\ 0\ 1\ 1\ 1\ 0\ 0\ 0\ 0\ 0\ 1\ 0\ 1\ 1]^t \quad \text{[Equation 13]}$ The construction of the main SRG which combines and produces the sampling vector and the correction vector is illustrated in FIGS. 9 and 10. FIG. 9 shows the main SRG used in the DSA spreading section of the base station, and FIG. 10 shows the main SRG used in the DSA despreading section of the mobile station.

As described above, the high-speed cell searching method and apparatus using the DSA according to the first embodiment of the present invention applies the DSA technique based on the state estimation for the code acquisition to the discrimination and synchronization of the sequences in the cell asynchronous DS/CDMA system, and thus can more rapidly acquire the sequences to be synchronized in the DS/CDMA system using a plurality of long-period PN sequences.

Specifically, the main SRGs of the base station and the mobile station can be simultaneously synchronized by spreading the state samples of the pairs of the main sequences produced from the two main SRGs in the form of DPSK symbols by the igniter sequences and transmitting the DPSK symbols. Accordingly, the mobile station can identify (i.e., discriminate) the cells at a very high speed and achieve the synchronization of the scrambling code timing without increasing the implementation complexity.

Also, according to the present invention, respective cells are designated to belong to one among 7 cell groups, and corresponding igniter sequences are allocated to the different groups, respectively, so that the pilot collision among the neighboring cells can be prevented.

Second Embodiment

In the second and third embodiments of the present invention, in order to realize the correlation-assistant distributed sample acquisition process to which the correlation operation for the state symbols is added, the respective mobile station stores therein both the long-period scrambling sequences used in the system and the state sample sequences determined in advance by the sampling interval of the state samples.

Hereinafter, the second embodiment of the present invention will be explained based on the W-CDMA system of IMT-2000 which represents the cell asynchronous system.

In the down link of the W-CDMA system, the respective 512 cells may use a plurality of scrambling codes, but the main scrambling sequence determined by the cell number is allocated to each cell, and used for scrambling the P-CPICH and P-CCPCH.

The cell search (or cell sequence acquisition) in the mobile station is the process of discriminating the main scrambling sequence of the cell where the mobile station itself is currently positioned and searching the timing. In the W-CDMA system of IMT-2000, the main scrambling sequence allocated to the respective base station is a complex gold sequence cut with a length of 36,000 chips. Specifically, the in-phase (hereinafter referred to as I) main scrambling sequence is the gold sequence obtained by exclusive-OR-gating the initial 38,400 chip portions of the main sequences produced from the two SRGs (the first main SRG and the second main SRG of FIG. 12 to be explained later) using the following equation 14 (inherent polynomial), and the quadrature-phase (hereinafter referred to as Q) main scrambling sequence is the gold sequence obtained by exclusive-OR-gating the 38,400 chip portions which start after 131,072 chips of the main sequence produced from the two SRGs used for producing the I main scrambling sequence.

$$\psi_2(x) = x^{18} + x^{10} + x^7 + x^5 + 1 \qquad \text{[Equation 14]}$$

If the current states of the SRGs of the mobile station, which produce the scrambling codes, coincide with those of the SRGs of the base station, the complex main scrambling sequences respectively produced from the mobile station and the base station are spontaneously synchronized.

The typical initial state of the respective SRG for producing the complex main scrambling sequence is determined as follow.

In case that the respective base station has cell numbers in the range of 1 to 512, the base station determines the state of the first main SRG as its cell number represented by a 18-bit binary number, and determines the state of the second main SRG as a 18-bit binary number of 1 in succession at the starting point of the P-CPICH frame (38,400 chip length) to be transmitted by the base station itself. By exclusive-OR-gating the main sequences produced from the two main SRGs whose initial states have been determined, the respective base stations. (i.e., cells) have different gold sequences.

The main scrambling sequence allocated to the respective base station is a complex gold sequence cut with the 38,400 chip length, and the P-CPICH frame having the 38,400 chip length is divided into 15 slots each of which is composed of 2,560 chips. Each slot is composed of 10 pilot symbols each of which is composed of 256 chips. Thus, in each frame exist 150 pilot symbols each of which is composed of 256 chips. At this time, the P-CPICH of the system using the (correlation-assistant) DSA technique is scrambled by the igniter sequence having a 256-chip length.

Also, in order for the receiving part to perform a high-speed acquisition of the igniter sequence, all the cells commonly transmit the primary synchronization code (PSC) having a 256-chip length. The receiving part receives the primary synchronization code at the start point of each slot.

Figure 11:
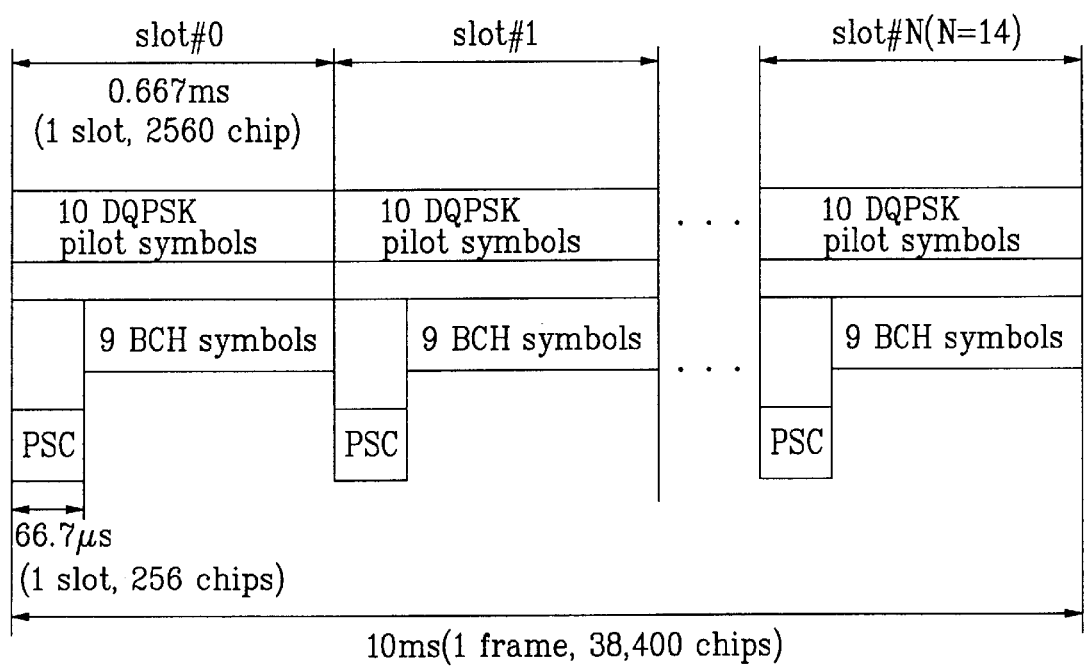
FIG. 11 is a view illustrating the channel structure and timing applied in acquiring scrambling sequences using the present invention in a W-CDMA system of IMT-2000.

In FIG. 11, the P-CCPCH of the respective cell, which transmits symbols of the broadcast channel (BCH), does not relate to the cell sequence acquisition, but is transmitted at a time point where the primary synchronization code (PSC) is not transmitted. Thus, the P-CCPCH is represented for the channel discrimination, and scrambled by the main scrambling sequence of the corresponding cell.

According to the existing 3-step cell searching process, the primary synchronization code (PSC) and the secondary synchronization code (SSC) are transmitted in parallel. According to the present invention, the secondary synchronization code (SCC) is not transmitted.

Now, the DSA technique applied to the W-CDMA system will be explained in detail with reference to FIGS. 1 and 12.

Figure 12:
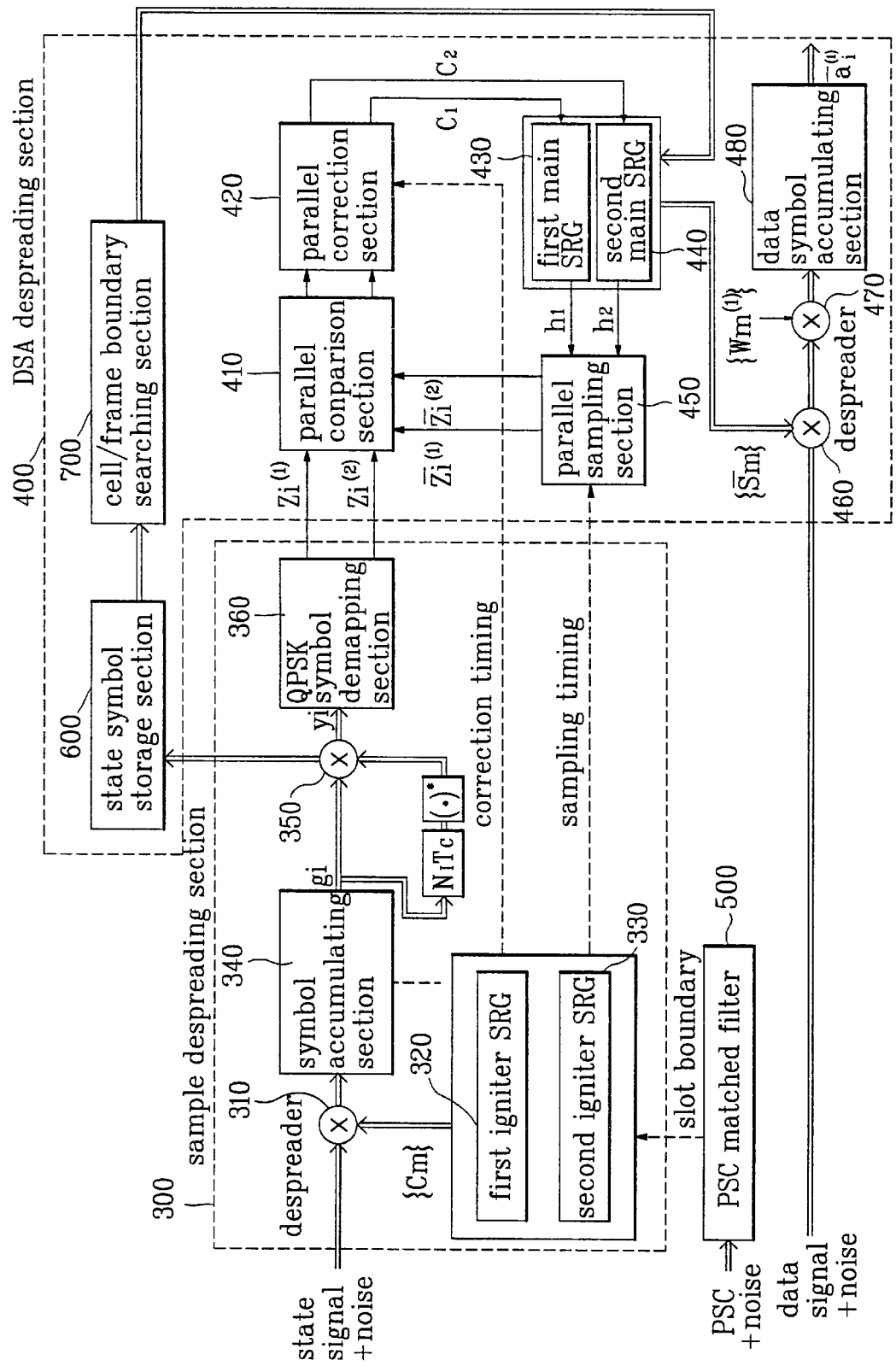
FIG. 12 is a block diagram illustrating a partial construction of the mobile station in a cell asynchronous W-CDMA system incorporating a correlation-assistant distributed sample acquisition technique according to a second embodiment of the present invention.

FIG. 1 is a block diagram illustrating the partial construction of the base station in the cell asynchronous W-CDMA system using the DSA technique, and FIG. 12 is a block diagram illustrating the partial construction of the mobile station according to the second embodiment of the present invention.

In FIG. 1, the base station (i.e., cell) comprises the DSA spreading section 10 and the sample spreading section 20, and in FIG. 12, the mobile station comprises a sample despreading section 300 and a DSA despreading section 400.

The DSA spreading section 10 and the DSA despreading section 400 perform the synchronization of the main sequence, and the sample spreading section 20 and the sample despreading section 300 perform the transfer of the state samples. Their functions are implemented by main SRGs 11, 12, 430, and 440 provided in the DSA spreading section 10 and the DSA despreading section 400, respectively, and by igniter SRGs 24, 25, 320, and 330 provided in the sample spreading section 20 and the sample despreading section 300, respectively.

The DSA spreading section 10 in the base station illustrated in FIG. 1 comprises the two main SRGs 11 and 12 for producing a pair of main sequences, a time-advanced parallel sampling section 13 for sampling state samples of the main SRGs 11 and 12 in conformity with a timing of sampling, spreaders 14, 16, and 18 for spreading input user data to a quadrature Walsh code, and scramblers 15, 17, and 19 for descrambling the signal spread to the quadrature Walsh code by a complex type scrambling sequence.

Also, the sample spreading section 20 of the base station includes the QPSK (quadrature phase shift keying) symbol mapping section 21 for mapping the two state samples outputted from the time-advance parallel sampling section 13 on respective code symbols and outputting corresponding QPSK symbols, and a block, connected to the QPSK symbol mapping section 21, for performing a differential encoding. This block adds an accumulated phase till the previous symbol time to a phase of the QPSK symbol and outputs the pilot symbol which is the DPSK symbol. The sample spreading section 20 also includes the igniter SRGs 24 and 25 for producing the complex type igniter sequences in order to spread the produced pilot symbols. Particularly, the sample spreading section 20 may perform the quadrature phase shift keying encoding instead of the differential phase shift keying encoding, and in this case, the sample despreading section 300 performs the quadrature phase shift keying decoding instead of the differential phase shift keying decoding.

The sample despreading section 300 of the mobile station illustrated in FIG. 12 includes a block for first obtaining the igniter sequences using the acquisition detectors. This block is provided with igniter SRGs 320 and 330 for producing igniter sequences, a despreader 310 for despreading the received state signals from the igniter sequences produced from the igniter SRGs 320 and 330, and a symbol accumulating section 340 for accumulating the state signal despread by the igniter sequences for a one-symbol period. The sample despreading section 300 also includes a block, connected to a block for obtaining the despreading by the igniter sequences and accumulating the signal, for performing a differential decoding, and a QPSK symbol demapping section 360 for demapping the symbols differential-decoded by the block and outputting two state samples different from each other.

Also, the DSA despreading section 400 of the mobile station comprises two main SRGs 430 and 440 for producing a pair of main sequences, a parallel sampling section 450 for sampling state samples of the main SRGs 430 and 440 in conformity with a sampling timing provided from the igniter SRGs 320 and 330, a parallel comparing section 410 for comparing the two state samples outputted form the QPSK symbol demapping section 360 with the two state samples outputted from the parallel sampling section 450, and a parallel correction section 420 for repeatedly correcting the states of the main SRGs 430 and 440 as many as a predetermined number of times in accordance with a correction timing provided from the igniter SRGs 320 and 330 and a comparison result of the parallel comparing section 410. At this time, the main SRGs 430 and 440 make their states coincide with the states of the main SRGs 11 and 12 in accordance with outputs of the parallel correction section 420. The DSA despreading section 400 further includes a descrambler 460 for descrambling the received data signal from the complex type scrambling sequences produced from the main SRGs 430 and 440, a despreader 470 for despreading the signal descrambled by the scrambling sequences from the quadrature Walsh code, and a data symbol accumulating section 480 for accumulating the signal despread from the quadrature Walsh code in the unit of a data symbol. The mobile station further comprises a PSC matched filter 500 used for a slot boundary discrimination for the cell sequence acquisition.

In the above-described construction, all the base stations commonly transmit the primary synchronization code (PSC) having a 256-chip length so that the mobile station can acquire the igniter sequences. At this time, the PSC is transmitted from the 256-chip section which is the initial transmission time point of each slot.

On the contrary, the PSC matched filter 500 of the mobile station, which received the PSC at the start point of each slot, searches the slot boundary by searching the time point where the maximum output value is outputted by the correlation.

Referring to the constructions illustrated in FIGS. 1 and 12, the cell sequence acquisition process will now be explained in detail.

The main sequence for generating the I main scrambling sequence produced from the main SRG 11 of the k-th base station and the main sequence for generating the I main scrambling sequence produced from the main SRG 12 are sampled by 256 chips from the start point of the frame, and first state samples and second state samples given by the following equations 15 and 16 are obtained.

$$[Z_{i,k}^{(1)}; i=0,1,\ldots,149,\ldots](k=1,2,\ldots,512) \quad \text{[Equation 15]}$$

$$[Z_{i}^{(2)}; i=0,1,\ldots,149,\ldots] \quad \text{[Equation 16]}$$

Here, since the state samples are obtained by sampling the sequence having the 38,400-chip period, they have a 150-sample period.

With respect to the first state samples, the initial state of the main SRG 11 is determined by the respective cell numbers, and thus the 512 cells produce different samples. On the contrary, with respect to the second state samples, the initial state of the main SRG 12 is determined as 1 of 18 bits irrespective of the cell number, and thus all the cells produce the same samples. Accordingly, in equation 16, the subscript k for discriminating the cells is removed.

Thereafter, in the base station (i.e., cell), the state sample pairs of the main SRGs 11 and 12 obtained by sampling by 256 chips the main sequences for generating the I main scrambling sequences, which are produced from the main SRGs 11 and 12 of the base station, are mapped onto the QPSK symbols, differential-decoded, and then transmitted as the pilot symbols of P-CPICH.

The P-CPICH is scrambled by the igniter sequences having the short period of the 256-chip length, and the number of igniter sequences (i.e., the re-use of the igniter sequences) used in the whole system is predetermined in accordance with the degree of interference caused by the igniter sequences used in other cells and the complexity of system implementation. Generally, 7 or 16 igniter sequences are used, but according to circumstances, the smaller or larger number of igniter sequences may be used.

Simultaneously, the primary synchronization code (PSC) symbols transmitted through the SCH are transmitted, crossing in time with the broadcast channel (BCH) symbols transmitted through the P-CCPCH of the respective cell.

Meanwhile, the mobile station identifies the igniter sequence and acquires the timing of the received pilot symbols by despreading the P-CPICH of the corresponding cell through the serial or parallel search.

Meanwhile, the mobile station may acquire the pilot symbol timing and the slot timing (i.e., slot boundary) by discriminating the timing representing the maximum output value after performing the correlation with respect to the received primary synchronization code (PSC) symbols using the PSC matched filter 500.

After the igniter sequence acquisition as described above, the mobile station sequentially obtains the transferred state sample pairs by detecting the pilot symbols.

Then, the mobile station detects the state samples from its main SRG 430 and main SRG 440 at the time point where each pilot symbol is detected, and compares them with the received state sample pair. If the state samples do not coincide as a result of comparison, the mobile station corrects the main SRGs 430 and 440, whose state sample does not coincide with the received state sample, through a proper correction operation whenever the non-coincident state sample is detected.

In case of the main SRGs 430 and 440 generating the main sequence having the length of 18, 18 times comparison and correction are performed. If the states of the main SRGs 430 and 440 of the mobile station coincide with the states of the main SRGs 11 and 12 of the base station, the cell sequence acquisition is completed.

The cell sequence acquisition procedure according to the above construction shows a very superior performance in the event that the channel environment is good. However, in the inferior environment, much more comparison and correction processes are required. According to the present invention, more progressive correlation-assistant distributed sample acquisition is performed based on the construction and operation illustrated in FIGS. 1 and 12 to achieve the optimum performance irrespective of the channel environment.

According to the correlation-assistant distributed sample acquisition process of the present invention, the mobile station identifies and acquires the igniter sequences transferring the state symbols from the current cell through the construction and operation illustrated in FIGS. 1 and 12, identifies the main scrambling sequences through the comparison and correction process, and acquires the frame boundary.

If the construction and operation illustrated FIGS. 1 and 12 is used in the very inferior channel environment, the synchronization is performed after much more comparison and correction is performed due to the generation of the detection error of the state symbols. Specifically, in order to discriminate the detection error generation, comparison and correction process is performed 18 times through 18 pilot symbols, V (for example, 7) pilot symbols are additionally detected, and it is discriminated whether the main sequence is synchronized by observing whether the state sample pairs generated by the mobile station itself coincide with the received state sample pairs. If any non-coincident state sample is observed as a result of discrimination, the comparison and correction process should be repeatedly performed again. If the synchronization of the igniter sequences is doubtful, the cell sequence acquisition process should be restarted.

According to the present invention, if the synchronization of the main scrambling sequences is not performed within a predetermined time due to the inferior channel environment and so on, the synchronization is performed through the correlation process for the state symbols.

The correlation process for the state symbols directly identifies the main scrambling sequences and the frame timing (i.e., boundary) through the element representing the maximum correlation value and the corresponding timing by correlating the sequence composed of the state symbols received up to the corresponding time point with the elements of the pre-stored state sample sequence group. For this, the mobile stations store in their memories (i.e., ROM) values as many as one period (length of 150) of the 513 state sample sequences shown in equations 2 and 3.

As described above, the base station maps onto the QPSK symbols the first state samples and the second state samples of equation 15 and 16, which are obtained by sampling the main sequences for generating the I main scrambling sequences produced from the main SRG 11 and the main sequences for generating the I main scrambling sequences produced from the main SRG 12 for 256 chips from the start point of the frame, and differentially encodes to the pilot symbols of P-CPICH to transmit the pilot symbols to the mobile station.

Simultaneously, the base station transmits the main primary synchronization codes (PSC) to the mobile station through the SCH. At this time, the primary synchronization codes (PSC) are transmitted, crossing in time with the symbols of the broadcast channel (BCH) transmitted through the P-CCPCH of the respective cell.

In FIG. 1, the time-advanced parallel sampling section 13 of the k-th base station samples the main sequences produced from its main SRGs 11 and 12 for 256 chips, i.e., at a time point (Tc is a chip time) of the following equation 17 with respect to a certain reference value (a natural number) r, and obtains the state samples of the following equation 18.

$$(r+I-1) \times 256 T_C \quad \text{[Equation 17]}$$

$$Z_{r+i,k}{}^{(1)}(k=1,2,\ldots,512)$$

$$Z_{r+i}{}^{(2)} \quad \text{[Equation 18]}$$

The obtained state samples are provided to the QPSK symbol mapping section 21, and the QPSK symbol mapping section 21 generates QPSK state symbols "$X_{r+i,k}$" by mapping the respective state symbols onto the I signal and Q signal of QPSK.

Thereafter, the differential-encoded pilot symbols "$f_{r+i,k}$" are obtained by adding the phase values of the state symbols "$X_{r+i,k}$" outputted from the QPSK symbol mapping section 21 to the phase value accumulated till the previous state symbol transmission time point.

Since the main scrambling sequence has the length of 38,400 chips and is sampled for 256 chips, the state symbol sequence "$\{X_{r+i,k}\}$" becomes the sequence having the period of 150, and the pilot symbols "$f_{r+i,k}$" are transmitted through the P-CPICH during the time given by the following equation.

$$[(r+I-1) \times 256 T_C, (r+I) \times 256 T_C] \quad \text{[Equation 19]}$$

As the igniter sequence "$\{C_m\}$" for scrambling the P-CPICCH is used the sequence allocated to the k-th base station among R short-period sequence having the length of 256 chips. The number of igniter sequences (i.e., the re-use of the igniter sequences =R) used in the whole system is predetermined in accordance with the degree of interference caused by the igniter sequences used in other cells and the complexity of system implementation. Here, the case that R=16 will be explained as an example.

The number of the cells which use the same igniter sequences among the 512 cells (i.e., base stations) is 32 in case that R=16. Accordingly, 16 base stations (i.e., cells) are formed according to the igniter sequences used in the respective base stations. In order to suppress the igniter sequence interference among the base stations, the base stations which belong to the same base station group are arranged not to neighbor each other in the system installing area.

With the transmission of the pilot symbols "$f_{r+i,k}$" as above, the base station simultaneously transmits the primary synchronization codes (PSC) having the length of 256 chips for the high-speed acquisition of the slot boundary for the 256-chip section at every start point of the slot. The broadcast channel (BCH) symbols are transmitted through the P-CCPCH during the section where no primary synchronization code (PSC) is transmitted for each slot.

Meanwhile, the data "$\{a^{[l]}_{r+i,k}\}$" of the l-th user of the k-th base station is spread to the quadrature Walsh code "$\{w_m^{[l]}\}$", and scrambled by the scrambling sequence.

The mobile station of FIG. 12 acquires the primary synchronization code (PSC) by searching the time point that represents the maximum correlation output value using a PSC matched filter 500 for the main synchronization code (PSC), and thus identifies the slot boundary accordingly. At this time, in order to heighten the performance of slot boundary discrimination, the mobile station preferably accumulates the energy for S slots, and then compares their output values.

After searching the slot boundary, the mobile station produces sequentially or in parallel 16 (i.e., R) igniter sequences used in the system, and correlates them with the received symbols of P-CPICH. The mobile station identifies the igniter sequence outputting the maximum correlation energy as a result of correlation as the igniter sequence that the k-th base station (i.e., k-th cell) where the mobile station itself is positioned. At this time, in order to heighten the performance of slot boundary discrimination, the mobile station preferably accumulates the energy as many as $V_I$ symbols before comparing the output energies in the same manner as the slot boundary discrimination.

In discriminating the igniter sequence, it is preferable to verify whether the slot boundary is well acquired by comparing the square root value of the output energy of the igniter sequence representing the maximum output with a predetermined threshold value $R_I$. Specifically, if the square root value of the output energy of the igniter sequence exceeds the threshold value $R_I$, the mobile station declares the completion of the igniter sequence acquisition, and performs the following step. If not, the mobile station re-performs the slot boundary discrimination.

Once the slot boundary is acquired, and the igniter sequence is discriminated as one among the 16 igniter sequences, the uncertainty of the frame timing is reduced to 15. Also, the uncertainty of the cell (i.e., the uncertainty of the scrambling sequence) is reduced from 512 to 32 according to the one-to-one relation between the igniter sequence and the base station (i.e., cell) group.

After the igniter sequence acquisition is completed, the mobile station despreads the P-CPICH to obtain pilot symbols soft-decision by the despreading. To explain this in more detail, the power of the P-CPICH is defined as $P_S$, the n-th pilot symbol is given by the following equation 20, and the igniter sequence used by the k-th base station is given by the following equation 21.

$$f_{n,k} \equiv e^{j\theta_{n,k}} \qquad \text{[Equation 20]}$$

$$c_k(t) \equiv \sum_{m=0}^{255} C_{m,k} P_{T_c}(t - mT_c) \qquad \text{[Equation 21]}$$

And, if it is defined that N(t) is channel noise, H a channel gain, $\omega_o$ a frequency error, $\phi$ a channel phase, and $\eta T_c$ a chip timing error ($|\eta| \leq 0.25$), the received signal is expressed by the following equation 22. Here, $P_{T_c}(t)$ represents the waveform of the chip pulse forming filter.

$$r(t) = \qquad \text{[Equation 22]}$$
$$\sum_{n=-\infty}^{\infty} \sqrt{P_s} H e^{j(\omega_{ij}t + \phi + \theta_{n,k})} C_k(t + \eta T_c - [n-1] \times 256 T_c) +$$
$$N(t)$$

And, the soft-decision pilot symbol produced by the despreading is given by the following equation 23.

$$g_{r+i} = \frac{1}{\sqrt{256 T_c}} \qquad \text{[Equation 23]}$$

$$\int_{(r+i-1) \times 256 T_c}^{(r+i) \times 256 T_c} r(t) C_k^*(t - [r+i-1] \times 256 T_c) dt$$

In equation 23, the sign "*" means a value of a conjugate complex number for a certain complex value.

Next, by performing the differential decoding as the reverse action of the differential encoding, the soft-decision state symbol given by the following equation 24 is obtained (in the present invention, a hard-decision state symbol may also be used for the scrambling sequence acquisition.

$$y_{r+i} = g_{r+i} \times g_{r+i-1}^* \qquad \text{[Equation 24]}$$

At this time, the mobile station obtains the soft-decision state symbol sequence given by the following equation 25 by sequentially storing the predetermined number (i.e., F, typically F=150) of soft-decision symbols in a state symbol storage section 600.

$$[y_{10\bar{r}+i} = i=0,1,\ldots,F-1] \qquad \text{[Equation 25]}$$

Here, the reason why 10 r-bar is used as the reference value instead of r is to indicate that since the slot boundary has been searched, the number of uncertain frame boundaries is not 150 which is the number of pilot symbols, but is reduced to 15 which is the number of slots.

Next, 15 correlation energy values given by the following equation 28 are obtained from the state sample symbols "$Z_{r+I}^{(2)}$" given by equation 18 and stored in the mobile station by correlating the soft-decision state symbol sequences with respect to 15 sequences generated by the mapping correlation given by the following equation 26 and the sequence phase shift given by the following equation 27. This is performed by a cell/frame boundary searching section 700.

$$w_i^{(2)} \equiv (-1)^{S_i(2)} \qquad \text{[Equation 26]}$$

$$[w_{10\bar{n}+i}^{(2)}: i=0,1,\ldots,F-1][\bar{n}=0,1,\ldots,14] \qquad \text{[Equation 27]}$$

$$E_{n,frame} = \left| \frac{1}{\sqrt{F}} \sum_{i=0}^{(F-1)} y_{10\bar{r}+i} w_{10\bar{n}+i}^{(2)} \right|^2, \bar{n} = 0, 1, \ldots, 14 \qquad \text{[equation 28]}$$

The frame boundary is obtained by searching the sequence phase shift "n-bar=$n_0$" representing the maximum value among the correlation energy values obtained by equation 28.

The correlation for the state symbols of the mobile station illustrated in FIG. 12 is simultaneously performed with the comparison and correction based synchronization using the DSA technique as described above referring to FIG. 2, and if the synchronization of the main scrambling sequence is not achieved by the comparison and correction based synchronization performed for the predetermined time, the synchronization is performed by the correlation for the state symbols.

Third Embodiment

Figure 13:
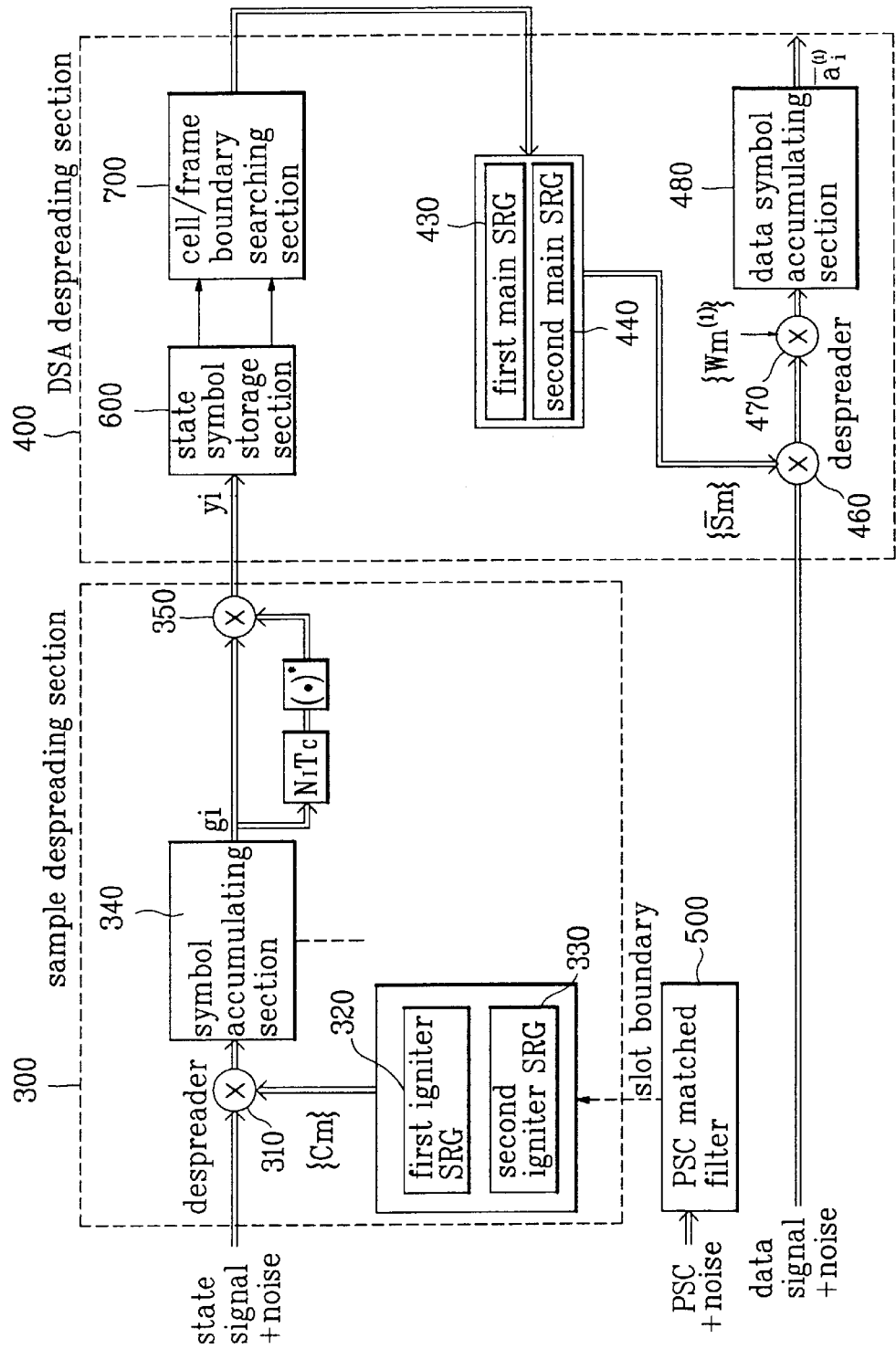
FIG. 13 is a block diagram illustrating a partial construction of the mobile station in a cell asynchronous W-CDMA system incorporating a correlation-assistant distributed sample acquisition technique according to a third embodiment of the present invention.

The synchronization can be achieved only by the correlation for the state symbols as shown in FIG. 13, to the exclusion of the comparison and correction based synchronization as shown in FIG. 12.

Meanwhile, if the primary synchronization code (PSC) is not used, and thus only the pilot symbol boundary is obtained instead of the slot boundary during the igniter sequence acquisition, r is used instead of 10r-bar, and n is used instead of 10n-bar. And, 150 (i.e., n=0,1, . . . , 149)

kinds of phase shift are determined and the sequence phase shift value representing the maximum correlation energy is obtained by the correlation.

In case of the cell synchronous system which shifts the phase of a single scrambling sequence and uses the phase-shifted scrambling sequences, the completed search of the frame synchronization means the completion of the cell acquisition. In case of the cell asynchronous system, the uncertainty to be additionally solved is which cell among the 32 cells that belong to the corresponding base station (i.e., cell) group the mobile station is positioned in, i.e., which cell among the 32 cells the scrambling sequence of the base station (i.e., cell) where the mobile station is positioned belongs to.

If the 32 cell numbers which belong to the base station group corresponding to the acquired igniter sequence in a one-to-one manner are "1,2, . . . , 32", the frame boundary has already been discriminated, and 32 correlation energy values, which are given by the following equation 30, are obtained from the state sample sequence "$Z^{(1)}_{r+i,k}$" (k=1,2, . . . , 512) given by the equation 18 by correlating the 32 sequences obtained by the mapping correlation in equation 29 with the soft-decision state symbol sequence.

$$w_{i,q}^{(1)} = (-1)^{Z_{i,q}^{(1)}}, q=1,2, \ldots, 32 \quad \text{[Equation 29]}$$

$$E_{n,cell} = \left| \frac{1}{\sqrt{F}} \sum_{i=0}^{(F-1)} y_{10r+i} w_{10n_0+i,q}^{(1)} \right|^2, q = 1, 2, \ldots, 32 \quad \text{[Equation 30]}$$

The cell discrimination is completed by searching the cell number $q=q_0$ representing the maximum value among the correlation energy values obtained by equation 30.

Since all the uncertainty for the frame boundary and the scrambling sequence has already solved by $n_0$ and $q_0$, the main SRG 430 of the mobile station provides the 18-bit binary value of the cell number as the state value, and the main SRG 440 provides the 18-bit binary value of 1 as the state value, at the time point of the corresponding frame boundary, so that the cell sequence acquisition in the mobile station is completed.

All the sequence values used for the correlation for obtaining the energy values of equations 28 and 30 can be generated if the mobile station has the received state symbol sequence and the state sample sequences for one period only.

The correlation for the soft-decision state symbols after the detection of the soft-decision state symbols is performed by the cell/frame boundary searching section 700, and for this, the state symbol storage section 600 stores therein all the soft-decision state sample symbols for one frame period.

Next, referring to FIG. 14, the correlation-assistant distributed sample acquisition process according to the present invention will be explained. In detail, the process of FIG. 14 produces an effective combination of the high-speed cell search based on the comparison-correction of the DSA technique and the state symbol correlation according to the present invention.

First, the mobile station acquires the primary synchronization code (PSC) and discriminates the slot boundary accordingly by searching the time point representing the maximum correlation output value using the PSC matched filter for the PSC (step S1).

After the slot boundary is searched, the mobile station produces R igniter sequences used in the system sequentially or in parallel, and correlates them with the received symbols of P-CPICH. Thereafter, the mobile station discriminates the igniter sequence which outputs the maximum correlation energy as a result of correlation as the igniter sequence being used by the k-th base station (i.e., k-th cell) where the mobile station itself is positioned. Then, the mobile station performs the verification for confirming whether the slot boundary is well acquired by comparing the square root value $V_I$ of the output energy of the igniter sequence representing the maximum output with the predetermined threshold value $R_I$ (step S2).

Here, if the square root value of the output energy of the igniter sequence exceeds the predetermined threshold value $R_I$, the mobile station declares the completion of the igniter sequence acquisition (step S3), and then performs the following step.

However, if the square root value of the output energy of the igniter sequence does not exceed the predetermined threshold value $R_I$, the mobile station re-performs the above steps (steps S1 and S2).

After the completion of the igniter sequence acquisition, the mobile station despreads the P-CPICH. Accordingly, the soft-decision pilot symbols are obtained by the despreading, and then the soft-decision state symbols are obtained by performing the differential decoding.

The mobile station performs the same cell sequence acquisition including the acquisition of the igniter sequence and the slot boundary and the generation of the soft-decision state symbols as described above with respect to the high-speed cell search based on the comparison-correction of the DSA technique and to the state symbol correlation according to the present invention.

Figure 14:
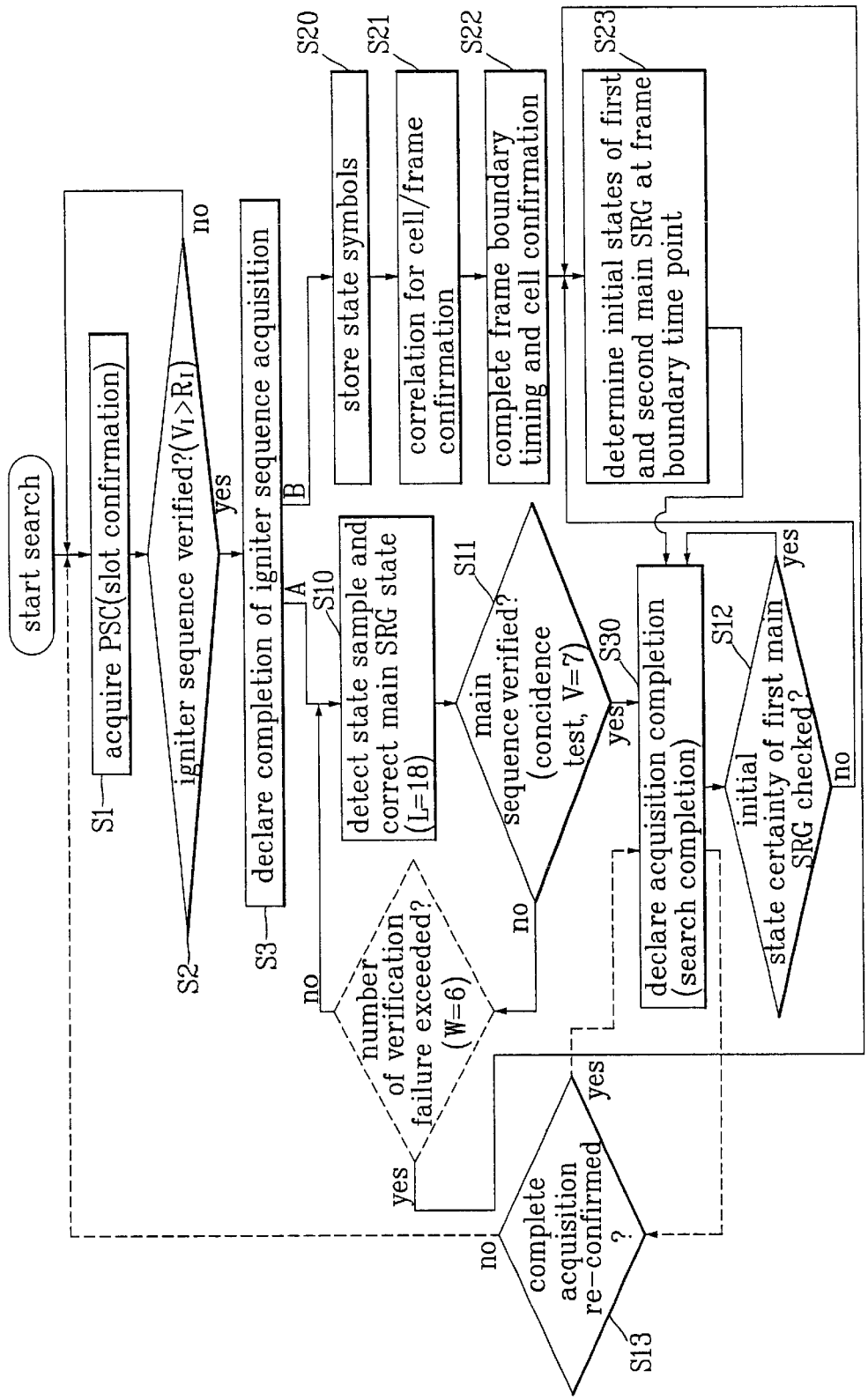
FIG. 14 is a flowchart illustrating the correlation-assistant distributed sample acquisition process according to the second and third embodiments of the present invention.

Next, the comparison-correction is repeatedly performed whenever each state symbol is received, and thus the synchronization is achieved before all F state symbols are received (A course in FIG. 14). Specifically, the mobile station stores the soft-decision state symbol "$y_{r+I}$" in a memory at the time point of "$(r+I) \times 256 T_c$", and simultaneously detects and transfers to the DSA despreading section the transmitted state sample pair "$Z^{(1)}_{r+i,k}$" and "$Z^{(2)}_{r+I}$". The DSA despreading section samples the state samples "$(Z^{(1)}_{r+I})$-bar" and "$(Z^{(2)}_{r+I})$-bar" from its first SRG and second SRG and compares them with the transmitted state sample pair "$Z^{(1)}_{r+i,k}$" and "$Z^{(2)}_{r+I}$" at the time point of "$(r+I) \times 256Tc$". If "$Z^{(j)}_{r+I}$)-bar" is different from "$Z^{(j)}_{r+i,k}$", the j-th (j=1,2) correction circuit $C_j$ corrects the j-th main SRG of the two main SRGs at the time point of "$[(r+I) \times 256+Dc] \times Tc$" with respect to Dc selected to satisfy "$0<Dc \leq 256$" (step S10). On the contrary, if "$(Z^{(1)}_{r+I})$-bar" coincide with "$Z^{(j)}_{r+i,k}$", the correction is not performed.

If corresponding circuits for the main SRGs of the mobile station are designed in accordance with the design of the correction circuit, sampling circuit, and time-advanced parallel sampling circuit for the DSA technique, the synchronization can be completed by the L times comparison and correction in the environment where the main SRGs having the length of L=18 and no detection error is generated.

Meanwhile, in case that the detection error is generated during the comparison-correction, the mobile station receives the L state symbols, performs the comparison and correction with respect to the state symbols, and then performs the hard detection of the state samples by additionally receiving the V (i.e., 7) state symbols. Thereafter, the mobile station performs the synchronization confirmation (i.e., main sequence verification) for comparing the hard-detection state samples with the state samples generated from the mobile station (step S11).

If all the state sample pairs coincide with one another during the V times comparison, the mobile station declares the completion of the main scrambling sequence acquisition (step S30), and then performs the next channel estimation. However, if any non-coincident state samples are generated during the V times comparison, the mobile station detects the state samples again, performs the L times comparison-correction, and then performs the V times synchronization confirmation in repetition (steps S10 and S11). That is, whenever the state symbols of "L+V=25" are received (i.e., with the transmission rate of about 1.66 ms) is given the opportunity for the main scrambling sequence acquisition by the comparison-correction and the V times synchronization confirmation.

Undoubtedly, the mobile station may further perform a process of an accurate acquisition re-confirmation (step S13) and a process of checking the initial state of the main SRG (step S12) even after the declaration of the completion of the main scrambling sequence acquisition for the certainty of the acquisition.

If the synchronization is not performed before all the F state symbols are received through the comparison-correction in case that the channel environment is inferior, i.e., if the synchronization is not performed within the predetermined time, the sequence acquisition is performed by the state symbol correlation ("B" course of FIG. 14).

In the environment where the channel state is very inferior, the probability of the main scrambling sequence acquisition by the comparison-correction and synchronization confirmation becomes very low, and thus the number of the soft-decision state symbols received and stored is increased.

Accordingly, if the acquisition by the comparison-correction and the synchronization confirmation fails W (i.e., 6) times, the soft-decision state symbols of "F=W(L+V)=150" are stored (step S20), and the mobile station abandons the main scrambling sequence acquisition by the comparison and correction at the time point of failure.

As a result, the mobile station performs the state symbol correlation, and performs the correlation for cell/frame confirmation using the received F soft-decision state symbols and the stored state sample sequences (step S21).

As described above, the correlation energy values as shown in equations 28 and 30 are obtained by the corresponding correlation, and by searching the sequence phase shift and the cell number representing the maximum value among the obtained correlation values, the frame boundary timing and the main scrambling sequence discrimination (i.e., initial state confirmation of the first main SRG) are completed in an instant (step S22). Thereafter, the initial states of the first main SRG and the second main SRG are determined at the time-point of the frame boundary (step S23).

L is determined by the length of the respective main SRG, but V and W (ultimately, F) are variables optimized when the system is designed.

Meanwhile, if the cell sequence acquisition is completed by the comparison and correction, the completion of the main scrambling sequence acquisition is declared. Simultaneously, an initial state certainty checking is performed to observe whether the state of one SRG corresponds to one among the 32 effective cell numbers which belong to the base station (i.e., cell) group determined by the igniter sequence when the state of the other SRG becomes the 18-bit binary number of 1 (step S12). At this time, if it is not identified as the effective cell number, the synchronization result by the comparison-correction is ignored, and the main SRGs are synchronized according to the frame boundary timing determined by the state symbol correlation and the discrimination (i.e., initial state confirmation of one main SRG) result of the main scrambling sequence after the F state symbols are received.

Next, whether the synchronization is effected is observed through the performance estimation such as the error of the transmitted data after the synchronization declaration of the main SRGs of the mobile station. If the performance is not satisfied, the cell sequence acquisition is re-performed.

Referring to FIG. 3, the mobile station received the transmitted state signal and data signal first obtains the igniter sequence using one among the noncoherent acquisition detectors illustrated in FIGS. 8 to 10.

As described above, the cell searching apparatus and method according to the second and third embodiment has the following effects.

The correlation-assistant distributed sample acquisition method and apparatus according to the present invention achieve a processing gain (i.e., spreading ratio) having a high state symbol signal to noise ratio, and thus can stably perform a high-speed acquisition even in the inferior channel environment.

Specifically, a stable synchronization can be achieved even in case that the energy of the signal arriving at the receiving part is very weak due to the low SNR, fading, shadowing effect, etc. This is because the SNR per state symbol is maintained in somewhat high level in the condition that the SNR per chip is very low since a state symbol is composed of many chip of about 256. In other words, since the state symbol sequences themselves are sequences generated from the sequences obtained by decimating the two main sequences, it maintains the property of the complex pseudo random sequence. Also, since the soft-decision state symbol sequence detected from the receiving part has the property of the pseudo random sequence wherein the SNR per symbol is maintained in somewhat high level, the correlation energy value (obtained by equations 15 and 17) becomes high only when n-bar=$n_0$ and q-bar=$q_0$, and otherwise, it becomes very low.

For example, if the variable is determined as F=150, the correlation is performed using the energy of the whole frame, and the frame boundary timing and the scrambling sequence are discriminated based on the correlation output, so that the possibility of achieving the cell sequence acquisition becomes very high even in the inferior channel environment.

Also, the strong cell sequence acquisition by the state symbol correlation according to the present invention has an advantage that it can achieve the stable synchronization even in the environment where some frequency offset exists between the base station and the mobile station. That is, since the state symbol sequence is differentially decoded and transmitted, respective elements of the state symbol sequence obtained through the differential decoding in the receiving part have the same amount of phase offset instead of frequency offset, and this phase offset is removed in the process of extracting the correlation values (obtained by equations 28 and 30), not affecting the correlation performance.

Finally, according to the present invention, since the state symbol correlation and the comparison-correction of the DSA technique are combined, a strong acquisition performance is obtained through the high-speed acquisition by the comparison-correction and the state symbol correlation, and thus a high-speed cell search can be stably performed in the actual mobile communication environment where the channel change is frequent.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A high-speed cell searching apparatus for a communication system comprising;
   a distributed sample acquisition (DSA) spreading section for producing scrambling sequences in a complex form using at least two first main sequences, spreading and scrambling a data using a spreading sequence and the scrambling sequences, and sampling respective states of the at least two first main sequences;
   a sample spreading section for modulating respective state sample values outputted from the DSA spreading section into code symbols, and spreading the modulated symbols using at least two first igniter sequences;
   a sample despreading section for producing at least two second igniter sequences, and despreading and demodulating the input state signals using the second igniter sequences; and
   a DSA despreading section for producing at least two second main sequences, and descrambling and despreading the data by descrambling sequences in a complex form produced using the state samples outputted from the sample despreading section and the second main sequences and the despreading sequences.

2. The apparatus as claimed in claim 1, wherein the DSA spreading section further comprises a switch for selectively outputting a primary synchronization code (PSC) for effecting acquisition of the igniter sequences or the spread and scrambled user data.

3. The apparatus as claimed in claim 1, wherein the sample despreading section further comprises a primary synchronization code (PSC) matched filter used for slot boundary discrimination for cell sequence acquisition.

4. A high-speed cell searching apparatus for a communication system comprising;
   a distributed sample acquisition (DSA) spreading section for producing scrambling sequences in a complex form using a pair of first main sequences, spreading and scrambling a data using a spreading sequence and the scrambling sequences, and sampling respective states of the pair of first main sequences;
   a sample spreading section for modulating respective state sample values outputted from the DSA spreading section into code symbols, and spreading the modulated symbols using a pair of first igniter sequences;
   a sample despreading section for producing a pair of second igniter sequences, and despreading and demodulating input state signals using the second igniter sequences; and
   a DSA despreading section for producing a pair of second main sequences, comparing respective state samples obtained by sampling the second main sequences with respective state samples outputted from the sample despreading section, synchronizing the second main sequences and the first main sequences of the DSA spreading section through a repeated correction according to a result of comparison, and descrambling and despreading the data by descrambling sequences in a complex form produced using the synchronized second main sequences and the despreading sequences.

5. The apparatus as claimed in claim 4, wherein the DSA spreading section comprises:
   a pair of first main shift register generators (SRGs) for producing the pair of first main sequences;
   a first sequence producing section of producing the complex first scrambling sequences using the first main sequences;
   a time-advanced parallel sampling section for sampling in advance states of the first main sequences outputted from the first main SRGs;
   at least one spreader for spreading the user data to a quadrature Walsh code; and
   at least one scrambler for scrambling again the user data spread to the quadrature Walsh code by the complex first scrambling sequences.

6. The apparatus as claimed in claim 4, wherein the sample spreading section comprises:
   a quadrature phase shift keying (QPSK) symbol mapping section for mapping respective code symbols corresponding to the respective state samples of the first main sequences outputted from the DSA spreading section;
   an encoding section for encoding an output of the QPSK symbol mapping section in a QPSK manner; and
   a pair of igniter shift register generators (SRGs) for producing the first igniter sequences to spread symbols outputted from the encoding section.

7. The apparatus as claimed in claim 4, wherein the sample despreading section comprises:
   a pair of second igniter shift register generators (SRGs) for producing the pair of second igniter sequences;
   a despreader for despreading state signals outputted from the sample spreading section using the pair of second igniter sequences;
   a symbol correlation section for correlating the despread state signals in the unit of a symbol;
   a decoding section for decoding symbols detected as a result of correlation in a quadrature phase shift keying (QPSK) manner; and
   a QPSK symbol demapping section for demapping the decoded symbols and outputting state samples for the first main sequences.

8. The apparatus as claimed in claim 4, wherein the DSA despreading section comprises:
   a pair of second main shift register generators (SRGs) for producing the pair of second main sequences to provide samples to be compared with the state samples outputted form the sample despreading section;
   a parallel sampling section for sampling and outputting states of the second main SRGs;
   a parallel comparing section for comparing the state samples outputted from the parallel sampling section with state samples outputted from the sample despreading section for a predetermined number of times;
   a parallel correction section for repeatedly correcting the states of the second main SRGs for a predetermined number of times according to a result of comparison;
   a second sequence producing section for producing the complex second scrambling sequences using the second main sequences;
   a descrambler for descrambling the received user data by the complex second scrambling sequences;
   a despreader for despreading an output signal of the descrambler from the quadrature Walsh code; and a data symbol accumulating section for accumulating an output signal of the despreader in the unit of a data symbol.

9. The apparatus as claimed in claim 4, wherein the sample despreading section further comprises a matched filter for taking correlation for a primary synchronization code (PSC) received from a base station to acquire the igniter sequences.

10. A high-speed cell searching apparatus for a communication system comprising;
   a distributed sample acquisition (DSA) spreading section for producing first scrambling sequences in a complex form using a pair of first main sequences, spreading and scrambling a data using a spreading sequence and the scrambling sequences, and sampling respective states of the pair of first main sequences;
   a sample spreading section for modulating respective state sample values outputted from the DSA spreading section into code symbols, and spreading the modulated symbols using a pair of first igniter sequences;
   a sample despreading section for producing a pair of second igniter sequences, and producing soft-decision state symbols by despreading and demodulating state signals from the sample spreading section using the second igniter sequences; and
   a DSA despreading section for producing a pair of second main sequences, comparing respective state samples obtained by sampling the second main sequences with respective state samples outputted from the sample despreading section, synchronizing the second main sequences and the first main sequences of the DSA spreading section through a repeated correction according to a result of comparison, performing correlation for the soft-decision decision state symbols to acquire the first scrambling sequences previously used, and descrambling and despreading the data by second descrambling sequences in a complex form produced using the synchronized second main sequences and the despreading sequences.

11. The apparatus as claimed in claim 10, wherein the DSA spreading section comprises:
   a pair of first main shift register generators (SRGs) for producing the pair of first main sequences;
   a first sequence producing section of producing the complex first scrambling sequences using the first main sequences;
   a time-advanced parallel sampling section for sampling in advance states of the first main sequences outputted from the first main SRGs;
   at least one spreader for spreading the user data to a quadrature Walsh code; and
   at least one scrambler for scrambling again the user data spread to the quadrature Walsh code by the complex first scrambling sequences.

12. The apparatus as claimed in claim 10, wherein the sample spreading section comprises:
   a quadrature phase shift keying (QPSK) symbol mapping section for mapping respective code symbols corresponding to the respective state samples of the first main sequences outputted from the DSA spreading section;
   an encoding section for encoding an output of the QPSK symbol mapping section in a QPSK manner; and
   a pair of igniter shift register generators (SRGs) for producing the first igniter sequences to spread symbols outputted from the encoding section.

13. The apparatus as claimed in claim 10, wherein the sample despreading section comprises:
   a pair of second igniter shift register generators (SRGs) for producing the pair of second igniter sequences;
   a despreader for despreading state signals outputted from the sample spreading section using the pair of second igniter sequences;
   a symbol accumulating section for accumulating the despread state signals in the unit of a symbol;
   a decoding section for decoding output signal of the symbol accumulating section in a quadrature phase shift keying (QPSK) manner; and
   a CPSK symbol demapping section for demapping the decoded symbols and outputting state samples for the first main sequences.

14. The apparatus as claimed in claim 10, wherein the DSA despreading section comprises:
   a pair of second main shift register generators (SRGs) for producing the pair of second main sequences to provide samples to be compared with the state samples outputted form the sample despreading section;
   a parallel sampling section for sampling and outputting states of the second main SRGs;
   a parallel comparing section for comparing the state samples outputted from the parallel sampling section with state samples outputted from the sample despreading section for a predetermined number of times;
   a parallel correction section for repeatedly correcting the states of the second main SRGs for a predetermined number of times according to a result of comparison;
   a second sequence producing section for producing the complex second scrambling sequences using the second main sequences;
   a state symbol storage section for obtaining a soft-decision state symbol sequence by sequentially storing soft-decision state symbols;
   a cell/frame boundary searching section for obtaining correlation energy values by correlating the soft-decision state symbol sequence with a predetermined number of sequences to acquire the first scrambling sequences;
   a descrambler for descrambling the received user data by the complex second scrambling sequences;
   a despreader for despreading an output signal of the descrambler from the quadrature Walsh code; and
   a data symbol accumulating section for accumulating an output signal of the despreader in the unit of a data symbol.

15. The apparatus as claimed in claim 10, wherein the sample spreading section modulates the respective state sample values into the code symbols in a manner that it maps the respective state sample values onto the state symbols, and then differentially encodes the state symbols.

16. The apparatus as claimed in claim 10, wherein the sample despreading section obtains the soft-decision state symbols in a manner that it detects pilot signals by despreading a state signal received from the sample spreading section, and differentially decodes the pilot signals.

17. The apparatus as claimed in claim 10, wherein the sample despreading section further comprises a matched filter for taking correlation for a primary synchronization code (PSC) received from a base station to acquire the igniter sequences.

18. A high-speed cell searching apparatus for a communication system comprising;

a distributed sample acquisition (DSA) spreading section for producing first scrambling sequences in a complex form using a pair of first main sequences, spreading and scrambling user data using the scrambling sequences, and sampling respective states of the pair of first main sequences;

a sample spreading section for modulating respective state sample values outputted from the DSA spreading section into code symbols, and spreading the modulated-symbols using a pair of first igniter sequences;

a sample despreading section for producing a pair of second igniter sequences, and producing soft-decision state symbols by despreading and demodulating state signals from the sample spreading section using the second igniter sequences;

a state symbol storage section for storing the soft-decision state symbols in conformity to a specified frame period;

a cell/frame boundary searching section for correlating the soft-decision state symbols stored in the state symbol storage section to acquire the first scrambling sequences; and a DSA despreading section for producing a pair of second main sequences, synchronizing the second main sequences according to a correlation result from the cell/frame boundary searching section, and despreading and descrambling the spread user data by second scrambling sequences in a complex form produced using the synchronized second main sequences.

19. The apparatus as claimed in claim 18, wherein the DSA spreading section comprises:

a pair of first main shift register-generators (SRGs) for producing the pair of first main sequences;

a first sequence producing section of producing the complex first scrambling sequences using the first main sequences;

a time-advanced parallel sampling section for sampling in advance states of the first main sequences outputted from the first main SRGs;

at least one spreader for spreading the user data to a quadrature Walsh code; and at least one scrambler for scrambling again the user data spread to the quadrature Walsh code by the complex first scrambling sequences.

20. The apparatus as claimed in claim 18, wherein the sample spreading section comprises:

a quadrature phase shift keying (QPSK) symbol mapping section for mapping respective code symbols corresponding to the respective state samples of the first main sequences outputted from the DSA spreading section;

an encoding section for encoding an output of the QPSK symbol mapping section in a QPSK manner; and a pair of igniter shift register generators (SRGs) for producing the first igniter sequences to spread symbols outputted from the encoding section.

21. The apparatus as claimed in claim 18, wherein the sample despreading section comprises:

pair of second igniter shift register generators (SRGs) for producing the pair of second igniter sequences;

a despreader for despreading state signals outputted from the sample spreading section using the pair of second igniter sequences;

a symbol accumulating section for accumulating the despread state signals in the unit of a symbol; and a decoding section for decoding output signal of the symbol accumulating section in a quadrature phase shift keying (QPSK) manner.

22. The apparatus as claimed in claim 18, wherein the DSA despreading section comprises:

a pair of second main shift register generators (SRGs) for producing the pair of second main sequences synchronized with the first scrambling sequences according to a correlation result outputted from the cell/frame boundary searching section;

a second sequence producing section for producing the complex second scrambling sequences using the second main sequences;

a state symbol storage section for obtaining a soft-decision state symbol sequence by sequentially storing soft-decision state symbols;

a descrambler for descrambling the received user data by the complex second scrambling sequences;

a despreader for despreading an output signal of the descrambler from the quadrature Walsh code; and a data symbol accumulating section for accumulating an output signal of the despreader in the unit of a data symbol.

23. The apparatus as claimed in claim 18, wherein the sample despreading section further comprises a matched filter for taking correlation for a primary synchronization code (PSC) received from a base station to acquire the igniter sequences.

24. A high-speed cell searching method for a communication system comprising:

generating a first sequence based on first two main sequences generated from two main sequence generators;

sampling state values of respective main sequence generators and modulating sampled state values;

spreading and transmitting modulated state symbols with a second sequence generated based on first two igniter sequences;

scrambling and transmitting data with the first sequence;

receiving and despreading the state symbols with a third sequence generated based on second two igniter sequences;

obtaining the state values by demodulating the despreading output;

generating a fourth sequence based on second two main sequences from second two main sequence generators based on the state values; and receiving and descrambling the data with the fourth sequence.

25. The method as claimed in claim 24, further comprising:

storing for a predetermined frame period soft-decision state symbols obtained by the demodulation in preparation for a case that a state of the first main sequences of the base station is not synchronized with a state of the second main sequences of the mobile station through the step of comparison and repeated correction; and acquiring the first main sequences of the base station by performing correlation with respect to the stored soft-decision state symbols.

26. A high-speed cell searching apparatus for a communication system comprising:

a first despreading section configured to produce at least two first igniter sequences, to despread and demodulate received state signals into state samples using the at least two first igniter sequences, and to output the state samples; and a second despreading section configured to produce at least two first main sequences, and to descramble and despread data by descrambling sequences in a complex form produced using the state samples output from the first despreading section and the at least two first main sequences and the despreading sequences.

27. The apparatus as claimed in claim 26, wherein the received state signals are received from a transmitter and correspond to modulated sample states of at least two second main sequences of the transmitter and having been spread using at least two second igniter sequences of the transmitter.

28. The apparatus as claimed in claim 26, wherein the first despreading section further comprises a primary synchronization code (PSC) matched filter used for slot boundary discrimination for cell sequence acquisition.

29. A high-speed cell searching apparatus for a communication system comprising:

a first spreading section configured to produce scrambling sequences in a complex form using at least two first main sequences, to spread and scramble a data using a spreading sequence and the scrambling sequences, and sample respective states of the at least two first main sequences; and a second spreading section configured to modulate respective state sample values outputted from the first spreading section into code symbols, and to spread the modulated symbols using at least two first igniter sequences.

30. The apparatus as claimed in claim 29, wherein the second spreading section further comprises a switch for selectively outputting a primary synchronization code (PSC) for effecting acquisition of the igniter sequences or the spread and scrambled user data.

31. A method for high speed cell searching in a communication system comprising:

generating a first sequence based on first two main sequences;

sampling state information for the respective first two main sequences;

modulating sampled state information;

spreading and transmitting modulated state information with a second sequence generated based on first two igniter sequences; and scrambling and transmitting data with the first sequence.

32. A method for high speed cell searching in a communication system comprising:

receiving and despreading state information with a first sequence generated based on two igniter sequences;

obtaining state information from the despreaded state information;

generating a second sequence based on two main sequences generated based on the state information; and receiving and descrambling data with the second sequence.

* * * * *